United States Patent
Vajapeyam et al.

(10) Patent No.: US 10,397,754 B2
(45) Date of Patent: Aug. 27, 2019

(54) PACKET DATA CONVERGENCE PROTOCOL REORDERING WITH ENHANCED COMPONENT CARRIERS

(71) Applicant: QUALCOMM Incorporated, San Diego, CA (US)

(72) Inventors: Madhavan Srinivasan Vajapeyam, San Diego, CA (US); Jun Wang, Poway, CA (US); Siddhartha Mallik, San Diego, CA (US); Taesang Yoo, Riverside, CA (US); Abhijit Khobare, San Diego, CA (US); Ajay Gupta, San Diego, CA (US); Vikas Jain, San Diego, CA (US); Yongbin Wei, La Jolla, CA (US)

(73) Assignee: QUALCOMM Incorporation, San Diego, CA (US)

( * ) Notice: Subject to any disclaimer, the term of this patent is extended or adjusted under 35 U.S.C. 154(b) by 140 days.

(21) Appl. No.: 15/190,374

(22) Filed: Jun. 23, 2016

(65) Prior Publication Data

US 2017/0041767 A1    Feb. 9, 2017

Related U.S. Application Data

(60) Provisional application No. 62/201,964, filed on Aug. 6, 2015.

(51) Int. Cl.
*H04W 4/06* (2009.01)
*H04W 76/27* (2018.01)
(Continued)

(52) U.S. Cl.
CPC ............... *H04W 4/06* (2013.01); *H04L 47/34* (2013.01); *H04W 28/0205* (2013.01);
(Continued)

(58) Field of Classification Search
CPC ..... H04W 4/06; H04W 76/046; H04W 72/04; H04W 80/02; H04L 1/1841; H04L 5/001
See application file for complete search history.

(56) References Cited

U.S. PATENT DOCUMENTS

| | | | |
|---|---|---|---|
| 2013/0242859 A1* | 9/2013 | Celik | H04L 47/34 370/328 |
| 2015/0043435 A1* | 2/2015 | Blankenship | H04L 69/322 370/329 |

(Continued)

OTHER PUBLICATIONS

ISA/EP, International Search Report and Written Opinion of the International Searching Authority, Int'l Application No. PCT/US2016/039380, dated Sep. 22, 2016, European Patent Office, Rijswijk, NL, 11 pgs.

(Continued)

*Primary Examiner* — Jackie Zuniga Abad
(74) *Attorney, Agent, or Firm* — Holland & Hart LLP

(57) ABSTRACT

A device may support communication without a radio link control (RLC) layer, which may include receiving a packet data convergence protocol (PDCP) service data units (SDUs) for multiple radio bearers at a PDCP layer. The multiple radio bearers may have different reliability or delay targets, and a reordering procedure at the PDCP layer may be conducted on the different radio bearers. The reordering procedure may be a same reordering procedure for each of the radio bearers, with one or more parameters that may be adjusted based on one or both of the reliability target or delay target of the radio bearer.

27 Claims, 17 Drawing Sheets

(51) Int. Cl.
  *H04W 80/02* (2009.01)
  *H04W 72/04* (2009.01)
  *H04W 28/02* (2009.01)
  *H04L 12/801* (2013.01)
  *H04L 1/18* (2006.01)

(52) U.S. Cl.
  CPC ........... *H04W 72/04* (2013.01); *H04W 76/27* (2018.02); *H04W 80/02* (2013.01); *H04L 1/1841* (2013.01); *H04L 1/1874* (2013.01)

(56) References Cited

U.S. PATENT DOCUMENTS

| | | | | |
|---|---|---|---|---|
| 2016/0113058 A1* | 4/2016 | Jung | .................... | H04B 7/2612 370/328 |
| 2016/0164793 A1* | 6/2016 | Basu Mallick | ....... | H04W 28/06 370/235 |
| 2017/0085492 A1* | 3/2017 | Xiao | .................... | H04L 1/1874 |

OTHER PUBLICATIONS

Huawei et al., "PDCP Reordering Operation for the Alternative 3C," 3GPP Draft; R2-140053, Mobile Competence Centre; 650, Route Des Lucioles ; F-06921 Sophia-Antipolis Cedex ; France vol. RAN WG2, no. Prague, Czech Republic; 20140210-20140214, Feb. 9, 2014, XP050791489, 3rd Generation Partnership Project (3GPP).

Nokia Networks: "Discussion on Capacity Enhancement," 3GPP Draft; R3-150985 Capacity Enhancement Discussion, Mobile Competence Centre; 650, Route Des Lucioles ; F- 06921 Sophia-Antipolis Cedex ; France vol. RAN WG3, no. Fukuoka, Japan; 20150525-20150529, May 15, 2015, XP050972394, 3rd Generation Partnership Project (3GPP).

Wireless World Research Forum et al., "LTE Small Cell Enhancement by Dual Connectivity," Nov. 15, 2014, pp. 1-22, XP055301402, Retrieved from the Internet: URL:http://www.wwrf.ch/files/wwrf/content/ files/publications/outlook/Outlook15.pdf.

* cited by examiner

PACKET DATA CONVERGENCE PROTOCOL REORDERING WITH ENHANCED COMPONENT CARRIERS

CROSS REFERENCES

The present Application for Patent claims priority to U.S. Provisional Patent Application No. 62/201,964 by Vajapeyam et al., entitled "Packet Data Convergence Protocol Reordering with Enhanced Component Carriers," filed Aug. 6, 2015, assigned to the assignee hereof.

BACKGROUND

The following relates generally to wireless communication, and more specifically to packet data convergence protocol (PDCP) reordering with enhanced component carriers (eCCs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may each be referred to as a user equipment (UE).

In some cases, a wireless system may utilize multiple protocol layers to process wireless transmissions. For example, a system may be based on functions divided into a PDCP layer (e.g., for header compression and sequencing), a radio link control (RLC) layer (e.g., for error correction and segmentation/concatenation of packets), and a medium access control (MAC) layer (e.g., for multiplexing and error correction). One or more functions of the RLC layer may be redundant and may result in increased processing complexity and signaling overhead.

SUMMARY

A device may support communication without a radio link control (RLC) layer, which may include receiving packet data convergence protocol (PDCP) service data units (SDUs) for multiple radio bearers at a PDCP layer. The multiple radio bearers may have different reliability targets (e.g., packet error loss) or delay targets (e.g., packet delay budget, latency targets, etc.), and a reordering procedure at the PDCP layer may be conducted on the different radio bearers. The reordering procedure may be a same reordering procedure for each of the radio bearers, with one or more parameters that may be adjusted for each of the bearers based on one or both of a reliability target or a delay target of the respective radio bearer.

A method for wireless communication is described. The method may include receiving a first plurality of PDCP SDUs at a PDCP layer of a receiver for a first radio bearer carrying data with a first reliability target; receiving a second plurality of PDCP SDUs at the PDCP layer of the receiver for a second radio bearer carrying data with a second reliability target that is lower than the first reliability target; and managing a reordering procedure at the PDCP layer on the first plurality of PDCP SDUs and on the second plurality of PDCP SDUs.

An apparatus for wireless communication is described. The apparatus may include a processor, memory in electronic communication with the processor, and instructions stored in the memory. The instructions may be executable by the processor to cause the apparatus to receive a first plurality of PDCP SDUs at a PDCP layer of a receiver for a first radio bearer carrying data with a first reliability target; receive a second plurality of PDCP SDUs at the PDCP layer of the receiver for a second radio bearer carrying data with a second reliability target that is lower than the first reliability target; and manage a reordering procedure at the PDCP layer on the first plurality of PDCP SDUs and on the second plurality of PDCP SDUs.

Another apparatus for wireless communication is described. The apparatus may include means for receiving a first plurality of PDCP SDUs at a PDCP layer of a receiver for a first radio bearer carrying data with a first reliability target; means for receiving a second plurality of PDCP SDUs at the PDCP layer of the receiver for a second radio bearer carrying data with a second reliability target that is lower than the first reliability target; and means for managing a reordering procedure at the PDCP layer on the first plurality of PDCP SDUs and on the second plurality of PDCP SDUs.

A non-transitory computer-readable medium storing code for wireless communication is described. The code may include instructions executable to receive a first plurality of PDCP SDUs at a PDCP layer of a receiver for a first radio bearer carrying data with a first reliability target; receive a second plurality of PDCP SDUs at the PDCP layer of the receiver for a second radio bearer carrying data with a second reliability target that is lower than the first reliability target; and manage a reordering procedure at the PDCP layer on the first plurality of PDCP SDUs and on the second plurality of PDCP SDUs.

In some examples of the method, apparatuses, or non-transitory computer-readable medium described herein, the first radio bearer may be carrying data with a first delay target, and the second radio bearer may be carrying data with a second delay target that is shorter than the first delay target.

In some examples of the method, apparatuses, or non-transitory computer-readable medium described herein, the reordering procedure may include operations, features, means, or instructions for a reordering and discard procedure that sequences PDCP SDUs according to consecutive PDCP sequence numbers (SNs) and discards PDCP SDUs having PDCP SNs outside of a reordering window.

In some examples of the method, apparatuses, or non-transitory computer-readable medium described herein, the first radio bearer may be a signaling radio bearer (SRB) and the second radio bearer may be a data radio bearer (DRB).

In some examples of the method, apparatuses, or non-transitory computer-readable medium described herein, the first reliability target may correspond to an acknowledged mode (AM) radio bearer reliability target, and the second reliability target may correspond to an unacknowledged mode (UM) radio bearer reliability target.

In some examples of the method, apparatuses, or non-transitory computer-readable medium described herein, managing the reordering procedure may include operations, features, means, or instructions for configuring a first PDCP reordering window parameter for the first radio bearer based at least in part on the first reliability target or the first delay target; and configuring a second PDCP reordering window parameter for the second radio bearer based at least in part on the second reliability target or the second delay target. In some examples, the first PDCP reordering window parameter and the second PDCP reordering window parameter may be configured independently from each other. In some examples, managing the reordering procedure may include operations, features, means, or instructions for discarding one or more received PDCP SDUs received outside of a PDCP reordering window associated with the first radio bearer or the second radio bearer. In some examples, the first reordering window parameter and the second reordering window parameter each correspond to a range of PDCP sequence numbers (SNs) eligible for reordering, and wherein the range of PDCP SNs of the first reordering window parameter is larger than the range of PDCP SNs of the second reordering window parameter.

In some examples of the method, apparatuses, or non-transitory computer-readable medium described herein, the reordering procedure may include operations, features, means, or instructions for initiating an empty buffer timer for the first radio bearer or the second radio bearer following receipt of a latest sequential PDCP SDU associated with the respective first radio bearer or second radio bearer, the respective first radio bearer or second radio bearer having an associated reordering window; discarding a received PDCP SDU that is received outside of the associated reordering window if the empty buffer timer has not expired; and shifting the associated reordering window if the received PDCP SDU is received outside of the associated reordering window and the empty buffer timer has expired. In some examples, the empty buffer timer may be set based at least in part on one or both of a delay target or the reliability target of the respective first radio bearer or second radio bearer.

In some examples of the method, apparatuses, or non-transitory computer-readable medium described herein, the first radio bearer may a SRB, and managing the reordering procedure may include operations, features, means, or instructions for configuring a first PDCP reordering window parameter for the first radio bearer such that received PDCP SDUs are retained irrespective of whether the PDCP SDUs are received in sequential order and irrespective of an elapsed time between receipt of PDCP SDUs. In some examples, the reordering procedure may include operations, features, means, or instructions for initiating a reordering timer associated with the first radio bearer following receipt of a latest PDCP SDU associated with the first radio bearer; and triggering a PDCP status report with a transmitter of the first radio bearer in response to an expiration of the reordering timer prior to receipt of a next sequential PDCP SDU relative to the latest received PDCP SDU.

In some examples of the method, apparatuses, or non-transitory computer-readable medium described herein, the reordering procedure may include operations, features, means, or instructions for initiating a reordering timer associated with the first radio bearer following receipt of a latest PDCP SDU associated with the first radio bearer; and triggering a radio link failure (RLF) procedure for the first radio bearer in response to an expiration of the reordering timer prior to receipt of a next sequential PDCP SDU relative to the latest received PDCP SDU. In some examples, triggering the RLF procedure may include operations, features, means, or instructions for determining that one or more PDCP SDUs are missing from the first plurality of PDCP SDUs; and providing an indication that the one or more PDCP SDUs are missing to a radio resource control (RRC) layer. In some examples, triggering the RLF procedure may include operations, features, means, or instructions for determining that one or more new PDCP SDUs for the first radio bearer are received after the reordering timer has expired; and providing to a RRC layer an indication that the one or more new PDCP SDUs are received.

Some examples of the method, apparatuses, or non-transitory computer-readable medium described herein may include operations, features, means, or instructions for performing a PDCP re-establishment procedure for one or both of the first radio bearer or the second radio bearer, wherein the PDCP re-establishment procedure may be selected based at least in part on the first reliability target or the first delay target for the first radio bearer, or the second reliability target or the second delay target second radio bearer.

In some examples of the method, apparatuses, or non-transitory computer-readable medium described herein, for each radio bearer, performing the PDCP re-establishment procedure may include operations, features, means, or instructions for identifying one or both of the respective delay target or the respective reliability target for the radio bearer; configuring a status protocol data unit (PDU) transmission that indicates PDCP SDUs that have been received at the receiver based at least in part on one or both of the respective delay target or the respective reliability target; retaining sequential PDCP sequence numbers (SNs) and hyperframe numbers (HFNs) established prior to the PDCP re-establishment procedure in response to the configuring of the status PDU; and managing the reordering procedure at the PDCP layer may include operations, features, means, or instructions for configuring a re-establishment timer for reordering PDCP SDUs following initiation of the PDCP re-establishment procedure, and discontinuing reordering PDCP SDUs from prior to the initiation of the PDCP re-establishment procedure following an expiration of the re-establishment timer. In some examples, determining to configure the status PDU transmission may include configuring the status PDU transmission for SRBs and for DRBs with a reliability target that is greater than a threshold. In some examples, a duration of the re-establishment timer may be determined based at least in part on one or both of the respective delay target or the respective reliability target of the radio bearer.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
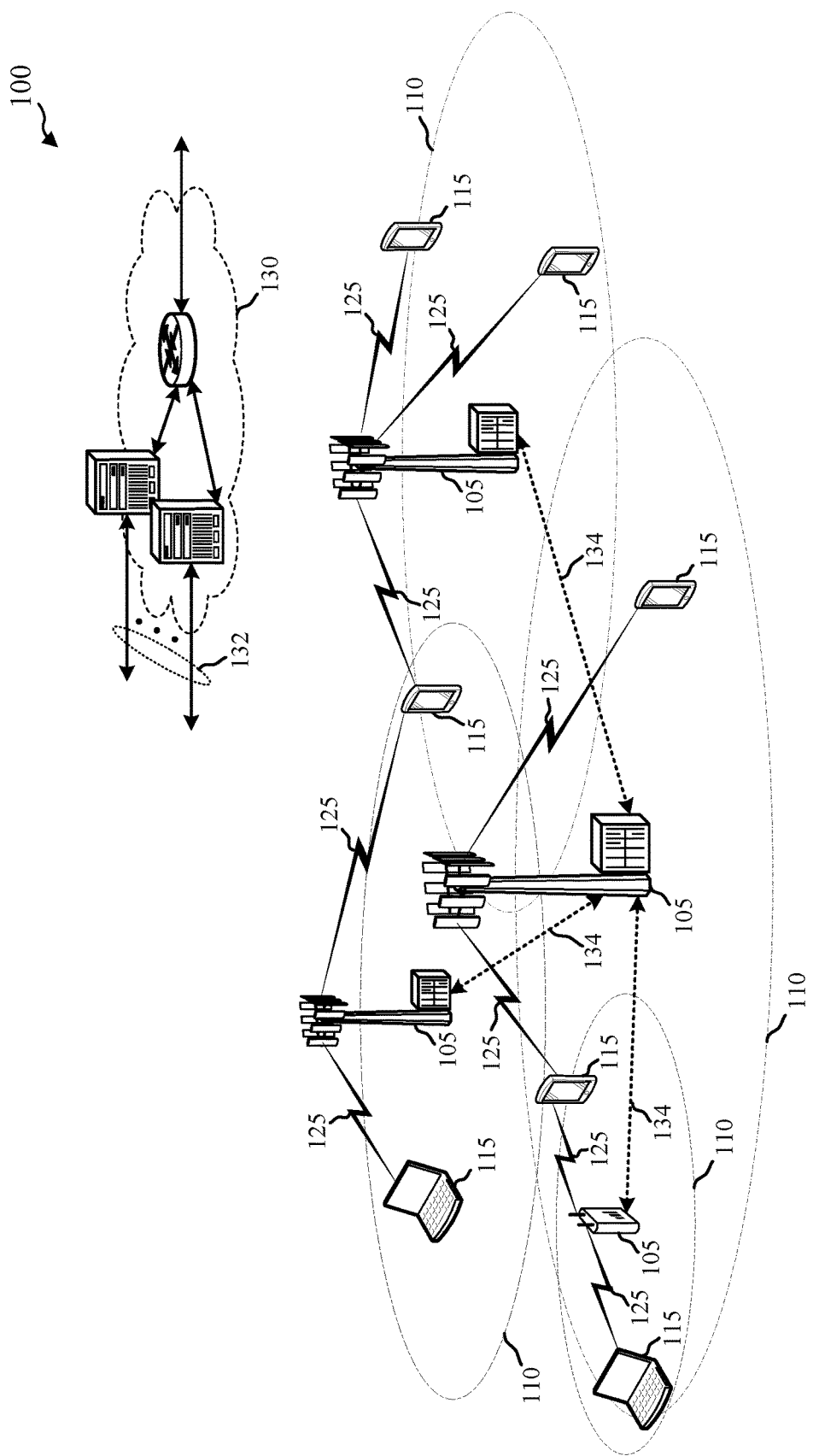
FIG. 1 illustrates an example of a wireless communications system that supports packet data convergence protocol (PDCP) reordering with eCCs, in accordance with various aspects of the present disclosure.

Wireless systems, according to various aspects of the disclosure, may be configured without or may otherwise support communication without a radio link control (RLC) layer. In some wireless systems, an RLC layer may perform packet segmentation, resegmentation, and reassembly. For devices that support communication without an RLC layer, actions traditionally associated with an RLC layer may be removed or handled at other layers. For example, some functions may be managed at a packet data convergence protocol (PDCP) layer, such as reordering and discarding of PDCP service data units (SDUs), performing header compression and decompression (e.g., using a robust header compression (ROHC) protocol), transfer of data (e.g., at a user plane or a control plane), maintenance of PDCP sequence numbers (SNs), and in-sequence delivery of upper layer PDUs to lower layers. The PDCP layer may also manage packets to avoid duplicates, ciphering and deciphering of user plane data and control plane data, integrity protection and integrity verification of control plane data, and packet discarding based on one or more timers. Other functions traditionally associated with an RLC layer may be handled at the media access control (MAC) layer. In some examples, the MAC layer may provide delivery notification to the PDCP layer, and may manage automatic repeat request (ARQ) and hybrid automatic repeat request (HARQ) retransmission. In some cases, the MAC layer may also segment, resegment, and concatenate packets. The PDCP layer and MAC layer, in some examples, may support different modes for data processing and delivery, such as a reliable mode in which packets are guaranteed delivery (e.g., replacing a legacy RLC acknowledged mode), a delay sensitive mode (e.g., replacing a legacy RLC unacknowledged mode with no guaranteed reliability), and a transparent mode that is a pass-through mode for signaling with no segmentation or guaranteed delivery (e.g., replacing a legacy RLC transparent mode).

As mentioned, a PDCP layer may be configured to manage reordering and discard procedures for different types of radio bearers. For example, the PDCP layer may manage reordering and discard procedures for two types of bearers, which may include a "type 1" radio bearer that may have a relatively high reliability target, and a "type 2" radio bearer that may have a relatively low delay target (e.g., a low latency target) without guaranteed reliability. In traditional systems, a type 1 radio bearer may be handled at the RLC layer through an acknowledgment mode (AM) operation, and a type 2 radio bearer may be handled at the RLC through an unacknowledged mode (UM) operation. For example, a type 1 bearer may include a SRB that may not have any associated mechanisms for triggering a retransmission at any upper layers, and a type 2 bearer may have one or more mechanisms at one or more upper layers to trigger retransmission of data (e.g., a transmission control protocol (TCP)).

Furthermore, in some cases it may be desirable to provide a relatively simple management process for various layers, including the PDCP layer, in which the number of modes of operation are kept relatively low. In such cases, rather than having multiple PDCP procedures at the PDCP layer, such as different modes based on AM or UM operation for different radio bearers, it may be desirable for the PDCP layer to operate using one common procedure for different types of bearers, such as a common procedure for both type 1 and type 2 bearers, in order to provide more simplified operations. In order to provide a common reordering and discard procedure, various examples provide for one or more reordering parameters that may be established to provide reordering windows, empty buffer timers, or reordering timers that may be selected based on bearer type. Various aspects of the disclosure further provide procedures for re-establishment of a PDCP connection following, for example, a handover or radio link failure (RLF).

Aspects of the disclosure introduced above are further described below in the context of an exemplary wireless communication system. Specific examples are then described including reordering and discarding of received PDCP SDUs, initiating timers associated with PDCP reordering and discarding, handling of signaling radio bearer (SRB) and data radio bearer (DRB) SDUs, and re-establishment procedures for PDCP re-establishment following a handover or radio link failure (RLF). These and other aspects of the disclosure are further illustrated by and described with reference to apparatus diagrams, system diagrams, and flowcharts that relate to PDCP procedures for different radio bearers for deployments using an eCC.

FIG. 1 illustrates an example of a wireless communications system 100 that supports PDCP reordering with eCCs, in accordance with various aspects of the present disclosure. The wireless communications system 100 includes base stations 105, user equipment (UEs) 115, and a core network 130. In some examples, the wireless communications system 100 may be a Long Term Evolution (LTE)/LTE-Advanced (LTE-A) network. In some cases, wireless communications system 100 may utilize a protocol stack in which the MAC layer communicates directly with the PDCP layer and replaces functionality that may otherwise be associated with the RLC layer.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communications system 100 may be based on a layered protocol system, which in some systems may include an internet protocol (IP) layer, a PDCP layer, a MAC layer, and a physical (PHY) layer. In some examples the protocol system may include an RLC layer, though as described herein, various functionality that may otherwise be associated with an RLC layer according to some communications protocols may be distributed to other portions of the protocol system (e.g., different layers, different constructs, different methods, etc.) to provide the described improvements in system performance. The PDCP layer in some systems may be responsible for receiving IP packets, performing header compression and decompression using, for instance, a robust header compression (ROHC) protocol, transfer of data (user plane or control plane), maintenance of PDCP sequence numbers (SNs), and in-sequence delivery of upper layer PDUs to lower layers. The PDCP layer may also manage packets to avoid duplicates, ciphering and deciphering of user plane data and control plane data, integrity protection and integrity verification of control plane data, and packet discarding based on one or more timers.

An RLC layer, when used, may connect higher layers (e.g., the PDCP layer) to the lower layers (e.g., the MAC layer). An RLC entity in a base station 105 or a UE 115 may support organization of transmission packets by monitoring transport block size (e.g., corresponding to the MAC layer transport block size). If an incoming data packet (i.e., a PDCP or radio resource control (RRC) SDU) is too big for transmission, the RLC layer may segment it into several smaller RLC PDUs. If the incoming packets are too small, the RLC layer may concatenate several of them into a single, larger RLC PDU. Each RLC PDU may include a header including information about how to reassemble the data. The RLC layer may also ensure that packets are reliably transmitted. The transmitter may keep a buffer of indexed RLC PDUs, and continue retransmission of each PDU until it receives the corresponding acknowledgement (ACK). In some cases, wireless communications system 100 may operate without an RLC layer, and one or more functions associated with the RLC layer may be performed by one or both the MAC layer or PDCP layer.

In some cases, the transmitter may send a Poll Request to determine which PDUs have been received and the receiver may respond with a Status Report. Unlike the MAC layer HARQ, RLC ARQ may not include a forward error correction function. An RLC entity may operate in one of three modes, namely in AM or UM as mentioned above, and transparent mode (TM), which may each be associated with a particular reliability target, and in some examples may each be further associated with a particular delay target (e.g., latency target). In AM, the RLC entity may perform segmentation and/or concatenation and ARQ. This mode may be appropriate for delay tolerant or error sensitive transmissions, in which transmissions may be associated with a relatively high reliability target, and may also be associated with a relatively long delay target (e.g., tolerant of a longer delay duration, longer latency, etc.). In UM, the RLC entity may perform segmentation and/or concatenation but not ARQ. This may be appropriate for delay sensitive or error tolerant traffic (e.g., voice over Long Term evolution (VoLTE)), in which transmissions may be associated with a relatively low reliability target (e.g., tolerant of dropped data, lost packets, etc.), and may also be associated with a relatively short delay target (e.g., a low latency target). Transparent mode (TM) performs data buffering, but may not include either concatenation and/or segmentation or ARQ. TM may be used primarily for sending broadcast control information (e.g., the master information block (MIB) and system information blocks (SIBs)), paging messages, and RRC connection messages. Some transmissions may be sent without RLC (e.g., a random access channel (RACH) preamble and response).

In some cases, as described further below, a system may support communication without an RLC layer. In such cases, functions performed by one or both the MAC layer or PDCP layer may replace some or all of the functions otherwise performed by an RLC layer. The MAC layer may, for example, perform mapping between logical and transport channels, prioritize channels, perform dynamic scheduling, and provide error correction, such as HARQ. HARQ may be a method of ensuring that data is received correctly over a communication link 125 by performing a combination of error detection (e.g., using a cyclic redundancy check (CRC)), forward error correction (FEC), and retransmission (e.g., ARQ). HARQ may improve throughput at the MAC layer in poor radio conditions (e.g., poor signal-to-noise conditions).

In some cases, wireless communications system 100 may utilize one or more enhanced component carriers (eCCs). An eCC may be characterized by features that include flexible bandwidth, different transmission time interval (TTI) durations, or modified control channel configurations. An eCC may be associated with a carrier aggregation (CA) configuration or a dual connectivity configuration (e.g., when multiple serving cells have a suboptimal backhaul link). An eCC may also be configured for use in an unlicensed radio frequency spectrum band or a shared radio frequency spectrum band (e.g., where more than one operator is licensed to use the spectrum). An eCC characterized by flexible bandwidth may include bandwidth segments or narrowband regions that may be utilized by UEs 115 incapable of monitoring the whole bandwidth or that favorably select the use of a limited bandwidth (e.g., to conserve power).

An eCC may utilize a different TTI duration than other component carriers (CCs), which may include use of a reduced or variable symbol duration as compared with TTIs of the other CCs. The symbol duration may remain the same, in some cases, but each symbol may represent a distinct TTI. In some examples, an eCC may include multiple hierarchical layers associated with the different TTI durations. For instance, TTIs at one hierarchical layer may correspond to uniform 1 ms subframes, whereas in a second layer, variable duration TTIs may correspond to bursts of short duration symbol periods. In some cases, a shorter symbol duration may also be associated with increased subcarrier spacing. In conjunction with the reduced TTI duration, an eCC may utilize dynamic time division duplex (TDD) operation (i.e., it may switch from downlink (DL) to uplink (UL) operation for short bursts according to dynamic conditions.)

Flexible bandwidth and variable duration TTIs may be associated with a modified control channel configuration (e.g., an eCC may utilize an enhanced physical downlink control channel (ePDCCH) for DL control information). For example, some control channels of an eCC may utilize frequency-division multiplexing (FDM) scheduling to accommodate flexible bandwidth use. Other control channel modifications include the use of additional control channels (e.g., for evolved multimedia broadcast multicast service (eMBMS) scheduling, or to indicate the length of variable length UL and DL bursts), or control channels transmitted at different intervals. An eCC may also include modified or additional HARQ related control information. As described herein, systems that utilize eCCs may support communications without an RLC layer, which may simplify or reduce redundant operation between layers of the protocol stack for the system.

A transmitting device, such as a UE 115 or a base station 105, may receive a PDCP PDU at the MAC layer. The device may then generate a set of transport blocks at the MAC layer using the PDCP PDU and transmit them over a wireless connection. A receiving device, such as a UE 115 or a base station 105, may receive the transport blocks at the MAC layer, generate a MAC SDU, and convey the MAC SDU to the PDCP layer. In some cases, the PDCP layer may then manage reordering and discard procedures for different types of radio bearers (e.g., type-1 radio bearers, type-2 radio bearers, data radio bearers, signaling radio bearers, etc.), and provide data to upper layers.

Figure 2:
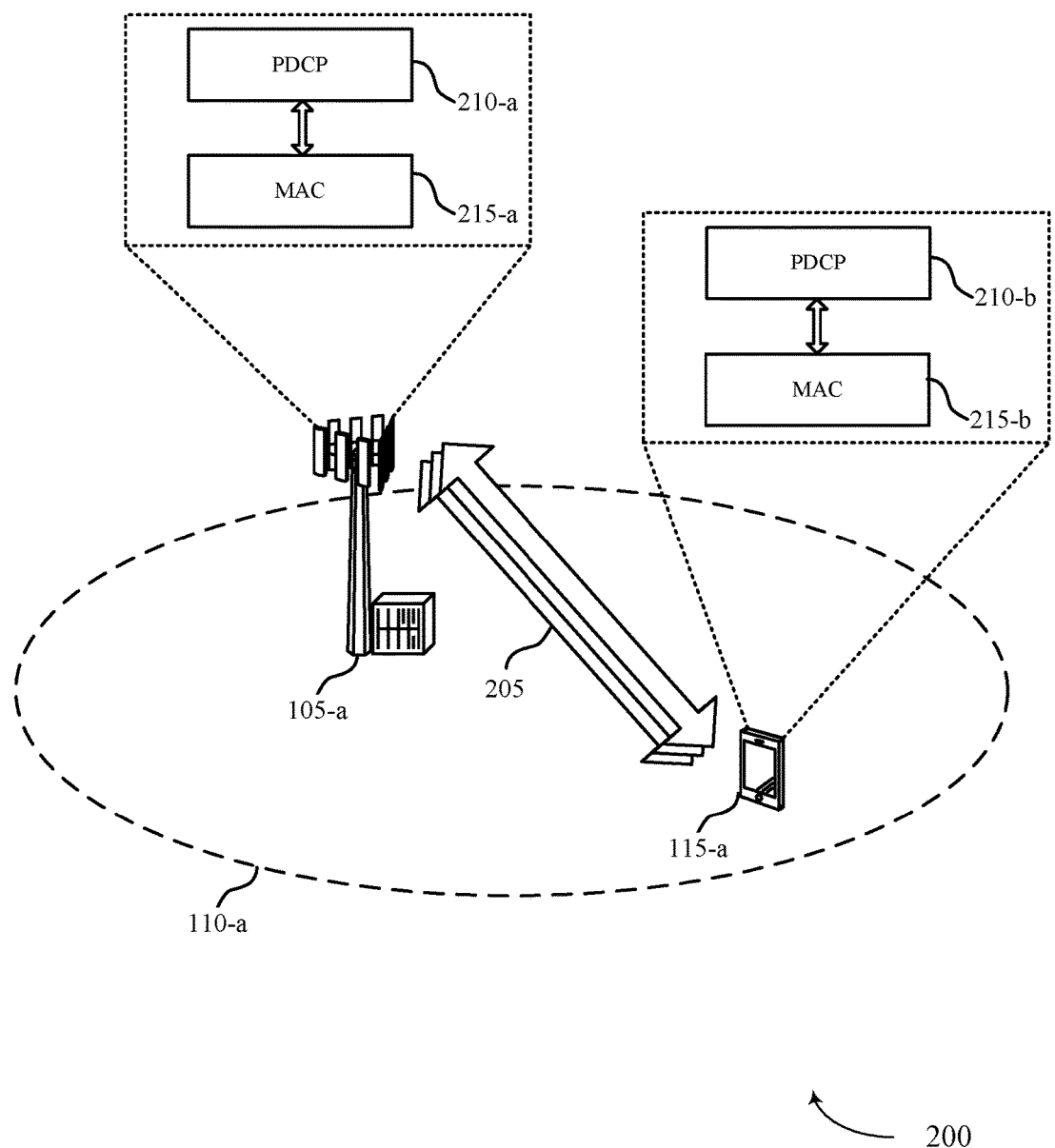
FIG. 2 illustrates an example of a wireless communications system that supports PDCP reordering with eCCs, in accordance with various aspects of the present disclosure.

FIG. 2 illustrates an example of a wireless communications system 200 for PDCP reordering with eCCs, in accordance with various aspects of the present disclosure. Wireless communications system 200 may include a UE 115-*a* and base station 105-*a*, which may be examples of a UE 115 and a base station 105 described with reference to FIG. 1. UE 115-*a* and base station 105-*a* may utilize a protocol stack in which the MAC layer communicates directly with the PDCP layer, and the MAC and PDCP layers may perform or replace various functions that may be otherwise associated with an RLC layer of other systems. UE 115-*a* and base station 105-*a* may communicate with one or several carriers 205 (e.g., including eCCs) and may utilize a protocol stack in which the PDCP layers 210 communicates directly with the respective MAC layers 215, without an intervening RLC layer.

In wireless communications system 200 that supports communications without an RLC layer, actions that may be otherwise associated with an RLC layer may be removed or handled at other layers. For example, functions such as reordering may be handled at the PDCP layers 210. Other functions may be handled at the MAC layers 215, such as some or all functions associated with scheduling and multiplexing.

The PDCP layers 210 may manage reordering and discarding of PDCP SDUs that are provided from the respective MAC layers 215 in PDCP PDUs. Each PDCP SDU may have a corresponding PDCP sequence number (SN) that may be used to reorder PDCP SDUs in consecutive order according to their associated SNs. The PDCP layers 210 may perform reordering by establishing a reordering window that defines a range of PDCP SNs that are eligible for reordering. If a PDCP PDU is received from a MAC layer 215 that contains SDUs with PDCP SNs outside of the reordering window, the respective PDCP layers 210 may discard the PDU. The PDCP layers 210 may then process non-discarded PDUs and store associated SDUs in a reordering buffer. The PDCP layers may associate a count value with the SDU that is a concatenation of a hyperframe number (HFN) and PDCP SN (e.g., having a 32 bit value), and performs deciphering of the SDU. The PDCP layers 210 may discard SDUs that are duplicated.

The PDCP layers 210 may deliver the resultant SDUs to respective upper layers in sequential order according to their associated PDCP SNs. In the event that one or more PDCP SDUs are in the reordering buffer that are not in sequential order, a reordering timer may be initiated. The first sequential missing SDU count value in the reordering buffer, in some examples, may be denoted as Reordering_PDCP_RX_COUNT. If the reordering timer expires for Reordering_PDCP_RX_COUNT, the PDCP layers 210 may deliver the non-sequential SDU to the respective upper layers. In such an event, any stored SDUs with a count value less than Reordering_PDCP_RX_COUNT may be discarded, and each stored SDU with a count value in sequence starting from Reordering_DCP_RX_COUNT may be delivered to the respective upper layers. In the event that one or more PDCP SDU remains in the reordering buffer (e.g., one or more sequential SDUs are missing), the PDCP layers 210 may update the value of Reordering_PDCP_RX_COUNT to be the count of the first non-sequential PDCP sequence number (SN) in the reordering buffer, and the reordering timer may be re-started.

As mentioned above, the PDCP layers 210 may perform a buffering or discarding function using the reordering window. In some examples, the reordering window may be one-half of available range of PDCP SNs, and PDCP PDUs that fall outside of the range may be discarded, with received PDCP PDUs within the range being stored (e.g., in a packet buffer) and processed. The reordering window, as noted above, may be anchored at the SN that was submitted to the respective upper layers, and PDUs received that are outside the window may be discarded while PDUs within the window may be stored and processed. The reordering window may be "pushed" when the last submitted SN is updated, due to, for example, reception of one or more missing SDUs or expiration of the reordering timer. A transmitting device, in some examples, may ensure that no more than half of the available PDCP SNs are in flight at a particular time, in order to provide flow control. The transmitting device may rely on delivery notifications from the MAC layer 215 of the receiving device.

In some examples, as will be discussed in more detail below, the length of the reordering window may be selected based on the type of radio bearer being received. For example, a type 2 radio bearer may require a relatively low delay in delivery of SDUs, and may be tolerant of some number of missing SDUs. In such cases, the length of the reordering window may be selected to be relatively long, such that a PDCP PDU is unlikely to contain PDCP SDUs with a SN that is outside of the reordering window, and thus less likely to be discarded. In the event that the reordering timer expires, PDUs received that have a gap from prior PDUs may transmitted. In other examples, an empty buffer timer may be initiated following the transmission of a last sequential SN to the upper layers that empties the reordering buffer. If a new PDU is received having PDCP SNs outside of the reordering window, and the empty buffer timer has expired, the reordering window may be pushed up (e.g., shifted) to the newly received PDU, thus prompting the newly received PDU to be stored, processed, and provided to the upper layers.

In further examples, a radio bearer may be a SRB, which may be relatively intolerant of missing SDUs. In some examples, the reordering timer for such radio bearers may be set to infinity (e.g., disabling a timer limitation, etc.), thereby helping ensure that PDCP PDUs are retransmitted by the transmitter. In other examples, the use of a reordering timer may be maintained, and the PDCP layer 210 may trigger a PDCP status report for the SRB to inform the transmitter of which PDCP SNs are received. In further examples, if one or more SRB SDUs are missing following expiration of the reordering timer, the PDCP layer 210 may indicate to a radio resource control (RRC) layer that SDUs are missing, and the RRC layer may trigger a re-establishment procedure (e.g., through triggering of a radio link failure (RLF)). Re-establishment may cause a status PDU to be provided to a transmitter, which may be used to retransmit missing SDUs.

Figure 3:
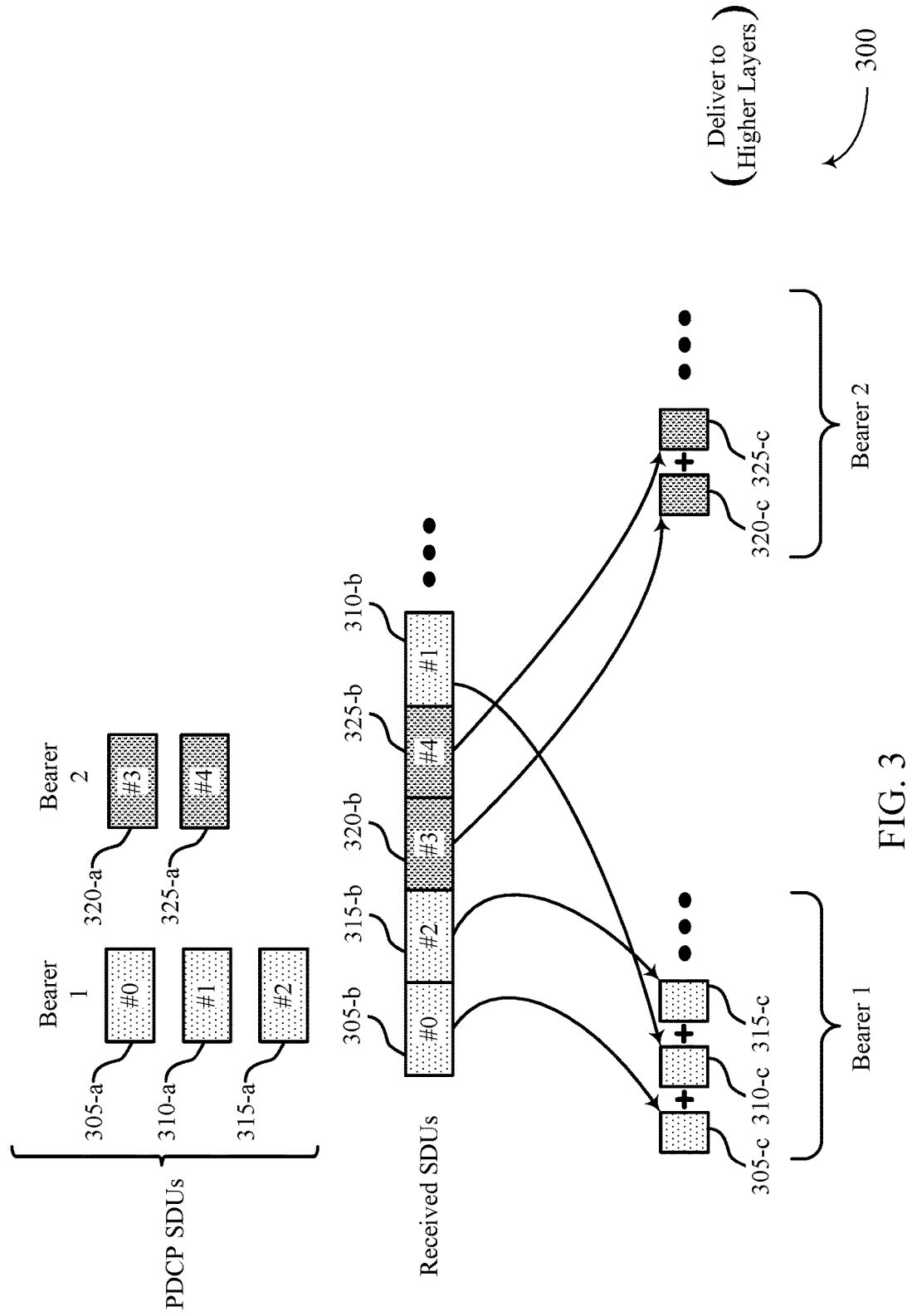
FIG. 3 illustrates an example of management of reordering of received PDCP SDUs in a system that supports PDCP reordering with eCCs, in accordance with various aspects of the present disclosure.

FIG. 3 illustrates an example 300 of management of reordering of received PDCP SDUs in a system that supports PDCP reordering with eCCs, in accordance with various aspects of the present disclosure. In the example 300 of FIG. 3, two radio bearers, radio bearer 1 and radio bearer 2, may include a number of PDCP SDUs, and may represent communications between a UE 115 and a base station 105 as described with reference to FIGS. 1-2. In this example, radio bearer 1 may include SDU#0 305-*a*, SDU#1 310-*a*, and SDU#2 315-*a*. Radio bearer 2 may include SDU#3 320-*a* and SDU#4 325-*a*. A transmitter (e.g., a base station 105 of FIG. 1 or 2) may initially transmit the SDU#0 305 through SDU#4 325 in a sequential order (e.g., SDU#0, then SDU#1, then SDU#2, then SDU#3, then SDU#4) to a receiver (e.g., a UE 115 of FIG. 1 or 2), and may retransmit one or more of the SDUs in the event of a negative acknowledgement (NACK) or lack of an ACK for a particular SDU. The receiver may receive the SDUs at the PDCP layer in a different order, and in this example may receive SDU#0 305-*b*, followed by SDU#2 315-*b*, SDU#3 320-*b*, SDU#4 325-*b*, and finally SDU#1 310-*b*. The PDCP layer may perform a reordering procedure for each of radio bearer 1 and radio bearer 2, and deliver radio bearer 1 SDUs 305-*c*, 310-*c* and 315-*c* to the upper layers, and deliver bearer 2 SDUs 320-*c* and 325-*c* to the upper layers in sequential order. The reordering procedure managed at the PDCP layer may be a same procedure applied to radio bearers of different types (e.g., when radio bearer 1 is a type 1 radio bearer and radio bearer 2 is a type 2 radio bearer).

Figure 4:
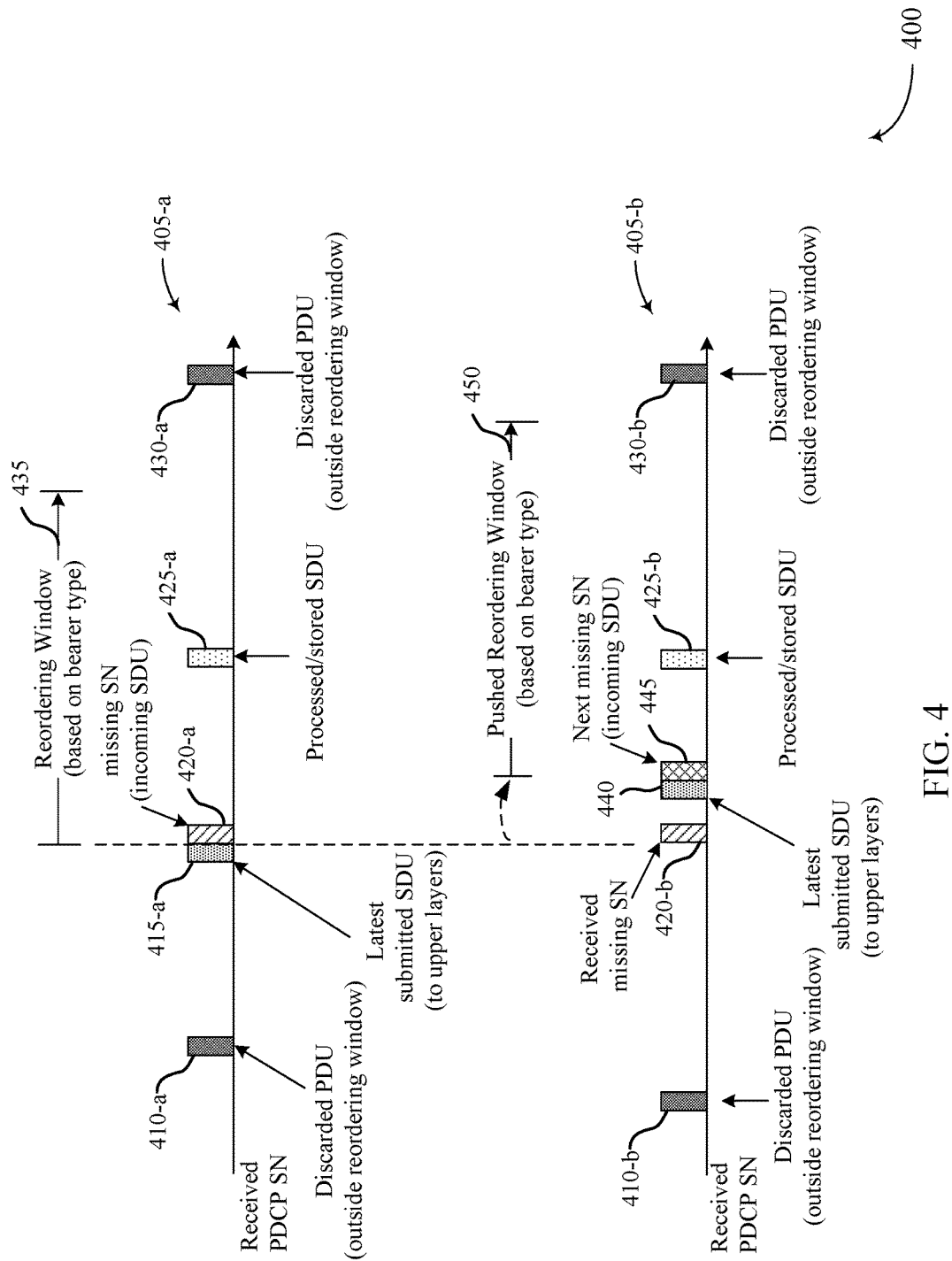
FIGS. 4-5 illustrate examples of reordering window management for reordering of received PDCP SDUs in a system that supports PDCP reordering with eCCs, in accordance with various aspects of the present disclosure.

FIG. 4 illustrates an example of reordering window management 400 for reordering of received PDCP SDUs in a system that supports PDCP reordering with eCCs, in accordance with various aspects of the present disclosure. The example of reordering window management 400 may represent communications between wireless devices such as a UE 115 and base station 105 as described with reference to FIGS. 1-2.

A receiving device may receive a number of PDCP PDUs at a PDCP layer from a MAC layer that may have associated PDCP SNs. Initially, received PDCP SNs 405-*a* may include a number of non-sequentially ordered PDCP SNs 410-*a* through 430-*a*. The PDCP layer may have an established reordering window 435 that defines a range of PDCP SNs that are eligible for reordering. In some examples, the range of SNs in the reordering window may be based at least in part on a type of radio bearer that is associated with the received data. As mentioned above, the reordering window 435 may start following an SN 415-*a*, associated with the latest PDCP SDU submitted to upper layers, thus putting a missing SN 420-*a* associated with a next sequential SN as the first SN in the reordering window 435. If one or more PDUs are received with SNs that are outside of the reordering window, such as PDUs associated with SN 410-*a* or SN 430-*a*, the associated PDUs may be discarded. The PDCP layer may then process non-discarded PDUs and store associated SDUs, such as processed/stored SDU associated with SN 425-*a*, in the reordering buffer. At some later point, the PDCP layer may receive another PDU associated with an SN that is within reordering window 435, and may process/store SDUs in the reordering buffer.

In the example of FIG. 4, subsequent received PDCP SNs 405-*b* may include a PDU having the missing SN 420-*b*. In such a case, the PDCP layer may determine the SN 440 associated with the latest PDCP SDU that has been submitted to the upper layers and identify a next missing SN 445. The PDCP layer may then modify (e.g., shift) the reordering window to have a range of SNs starting with the next missing SN 445 for an incoming PDU, generating a pushed reordering window 450. Similarly as discussed above, PDUs received that are outside of the pushed reordering window 450, such as PDUs associated with SNs 410-*b* and 430-*b*, may be discarded and the reordering buffer may contain processed/stored SDU associated with SN 425-*b*, which may have a PDCP SN within the pushed reordering window 450 that is non-sequential from the SN 440 associated with the latest submitted SDU.

The range of PDCP SNs in reordering window 435 or pushed reordering window 450 may be determined based on a number of factors. As mentioned above, the PDCP layer may operate according to multiple modes of operation, and in some examples a type 1 bearer may have a relatively shorter reordering window and a type 2 bearer may have a relatively longer reordering window. A relatively shorter reordering window may result in additional PDCP PDUs being discarded as being outside of the reordering window, which may initiate a retransmission of such PDUs. As mentioned above, a reordering timer may be initiated when an SDU with a non-sequential SN is placed in the reordering buffer, and in some examples the length of the reordering timer may be adjusted based on the type of bearer and the associated mode of operation. In some examples, a type 1 bearer may have a relatively shorter reordering window and a relatively longer reordering timer, thus enhancing the likelihood of receiving of each SDU, although in some cases there may be a relatively long delay. As discussed above, type 1 bearers may be more delay tolerant, and the reordering window and reordering timer may be provided based at least in part on such delay tolerance.

In other examples, SDUs may be associated with a type 2 bearer, which may be delay sensitive but more tolerant to missing SDUs (e.g., a VoLTE DRB). Such bearers may encounter a potential issue if the reordering window stalls, which may occur if packets are not received for a long time while the reordering timer is not running. For example, if processed/stored SDU associated with SN 425 is not present in the reordering buffer, the reordering timer is not initiated. In cases where channel conditions may result in signal fading and transmitted PDUs are not received at receiver, later transmitted PDUs that are received at the receiver when channel conditions improve may be outside of the reordering window 435 or pushed reordering window 450, and may be discarded. For delay sensitive radio bearers, such as type 2 bearers as mentioned above, such a situation may result in additional delay that may impact performance. In some examples, the PDCP SN range for reordering window for type 2 bearers may be increased, thus increasing the number of SDUs that may be placed in the reordering buffer and lowering the likelihood of the reordering window stalling. Furthermore, the reordering timer may be set to expire relatively quickly for such bearers, which may allow the reordering window to be pushed more quickly in the event of a missing SDU.

Figure 5:
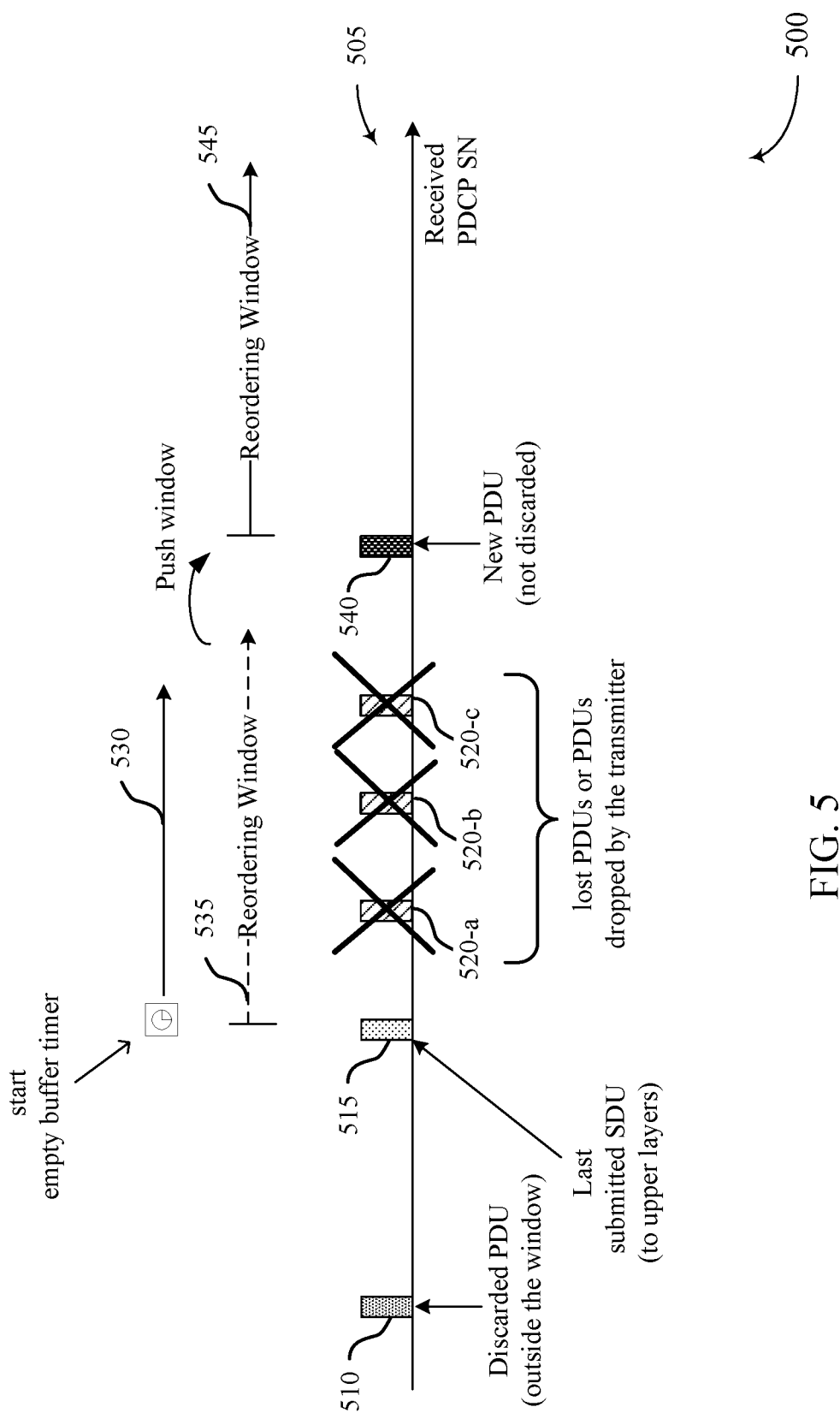

In other examples, additionally or alternatively to selecting reordering window parameters to accommodate reliability or delay targets of different bearers, an "empty buffer" timer may be used to push the reordering window. FIG. 5 illustrates an example of reordering window management 500 using an empty buffer timer in a system that supports PDCP reordering with eCCs, in accordance with various aspects of the present disclosure. The example of reordering window management 500 may represent communications between wireless devices such as a UE 115 and base station 105 as described with reference to FIGS. 1-2.

Similarly as discussed with respect to FIG. 4, a receiving device may receive a number of PDCP PDUs at a PDCP layer from a MAC layer that may have associated PDCP SNs. Initially, PDCP SNs 505 may include an SN 515 associated with a last SDU submitted to the upper layers. In this example, reordering window 535 may be set with a range of SNs starting with the next sequential SN to the last submitted SDU. In the event that no other SDUs are present in the reordering buffer, the PDCP layer may initiate empty buffer timer 530, which may run until a new PDU having a later sequential SNs is received at the PDCP layer. In the event that the transmitting device is attempting to transmit PDUs associated with SN 520 that are lost or dropped by the transmitter, PDUs associated with SN 520 (e.g., 520-a, 520-b, and 520-c) may not be received at the PDCP layer. As mentioned above, such a situation may occur in the event of degraded channel conditions (e.g., from interference from another device, movement of the transmitter or receiver to a location with poor channel conditions, etc.). Once the channel conditions improve a new PDU associated with SN 540 may be received at the PDCP layer. The PDU associated with SN 540 may be outside of the reordering window 535, but following the expiration of the empty buffer timer 530. In the event that the empty buffer timer 530 has expired, and a new PDU associated with SN 540 is received, the PDCP layer may push the range of SNs in to provide reordering window 545 with a range of SNs that start with a SN subsequent to the SN 540. The empty buffer timer 530 may thus act to reset the reordering window 535 and may reduce delay that may otherwise be introduced in providing data from the new PDU having SN 540 to the upper layers. In some examples, the empty buffer timer 530 may be initiated for delay sensitive bearers, such as type 2 bearers, and may be configured based on delay requirements associated with a particular bearer.

As mentioned above, different types of radio bearers may have different requirements associated with reliability or delay, and various reordering parameters may be configured according to the requirements of the radio bearer. In some examples, SRBs may be configured with reordering parameters that provide enhanced likelihood of proper reception and processing of SRB information. SRBs may have particularly high reliability requirements because these radio bearers may not have associated processes at the upper layers that may trigger retransmission of lost PDUs. Thus, the PDCP layer, in some examples, may manage SRBs to provide enhanced reception. In some examples, the reordering timer for SDUs associated with an SRB may be set to infinity (or a timer limitation for an SRB may be otherwise disabled), thus helping to ensure that PDCP PDUs are received in the reordering buffer prior to pushing the reordering window. In the event that a PDU is lost, the lack of receipt of the PDU will trigger a retransmission of the PDU by the transmitter, and the receiving PDCP layer will wait until the PDU is received before pushing the reordering window. In some examples, rather than setting an infinite reordering timer, the PDCP layer may trigger a PDCP Status Report for the SRB when the reordering timer expires, which will prompt the retransmission of missing PDUs. In further examples, the PDCP layer may inform the RRC layer of out-of-order delivery of PDCP PDUs, which may trigger the RRC layer to declare RLF and trigger a re-establishment procedure.

PDCP re-establishment procedures, according to some examples, may also be different for different types of radio bearers. PDCP re-establishment may be initiated following, for example, a handover or RLF. In some examples, type 1 radio bearers may have a similar PDCP re-establishment procedure as used according to a legacy RLC AM re-establishment, in which a status PDU transmission may be configured for packet forwarding or retransmission. PDCP SNs and HFNs, in such procedures, may be retained following re-establishment, and reordering may be supported without a timer limitation to enhance likelihood of reception of all PDUs. In some examples, type 2 radio bearers may have a re-establishment procedure that may have configurable parameters based on the radio bearer requirements. In some examples, a status PDU transmission may be configured, and retransmission may be performed up to a maximum delivery time, and forwarding may be performed over X2. In some examples, PDCP SN and HFN may be retained when status PDU transmission is configured, and may not be retained if the status PDU transmission is not configured. Reordering during re-establishment may be supported, and may use a configurable timer that is set based on one or more characteristics of the radio bearer. Thus, different modes may have re-establishment procedures that are selected based on the type of radio bearer.

Figure 6:
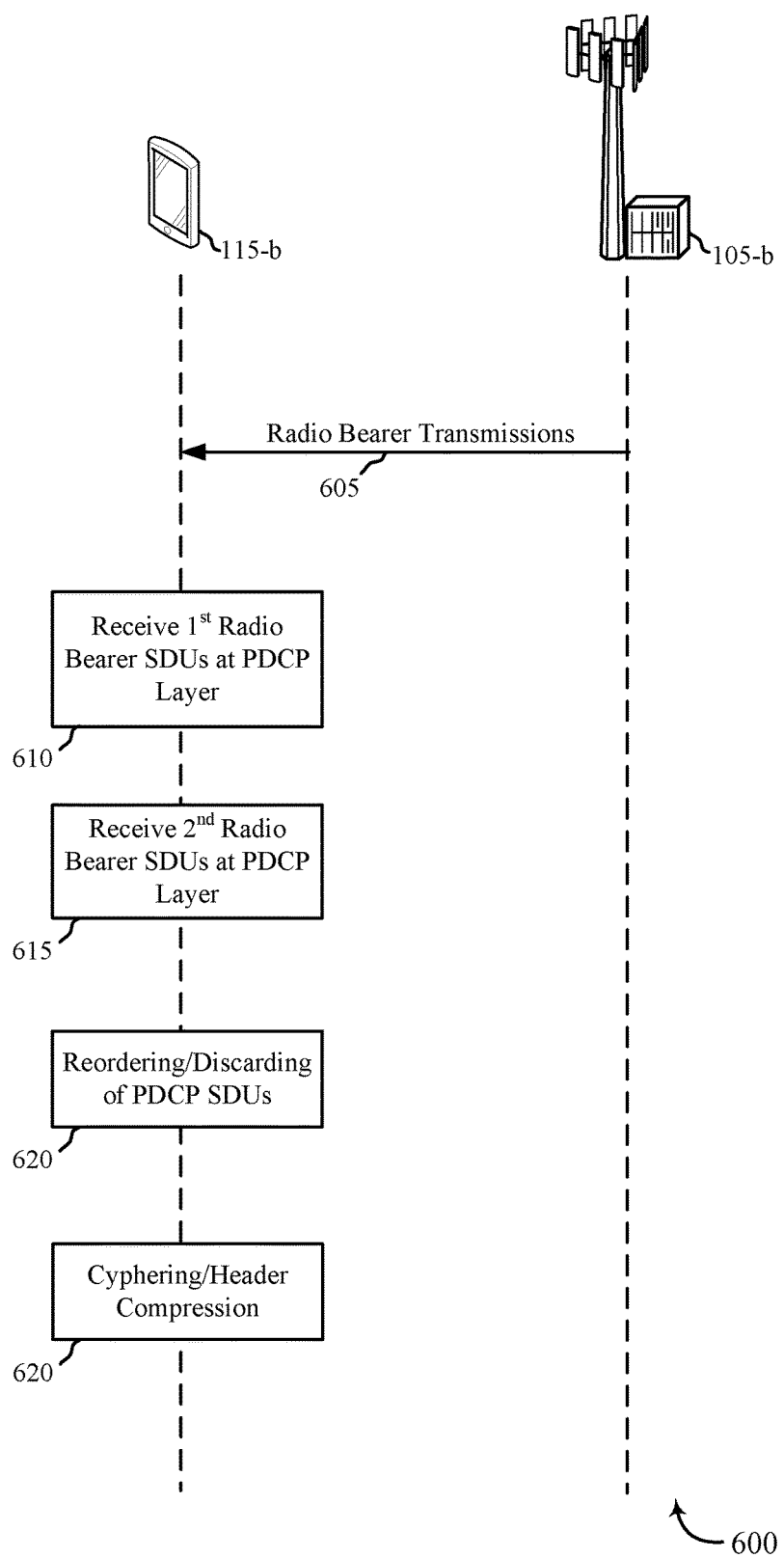
FIG. 6 illustrates an example of a process flow that supports PDCP reordering with eCCs, in accordance with various aspects of the present disclosure.

FIG. 6 illustrates an example of a process flow 600 for PDCP reordering with eCCs, in accordance with various aspects of the present disclosure. Process flow 600 may include a UE 115-b and base station 105-b, which may be examples of a UE 115 and base station 105 described with reference to FIGS. 1-2. While the example process flow 600 is directed to downlink communications, techniques described herein are also applicable to uplink communications, and PDCP reordering can also be performed by the base station 105-b for UL communications.

The base station 105-b may transmit radio bearer transmissions 605, that may be received at the UE 115-b. The UE 115-b, at block 610, may receive first radio bearer SDUs at the PDCP layer. The UE 115-b, as indicated at block 615, may also receive second radio bearer SDUs at the PDCP layer. As discussed above, the first radio bearer and the second radio bearer may be different types of radio bearers that may have different reliability targets, different delay targets, or combinations thereof. At block 620, the UE 115-a may manage a reordering/discard procedure on the received SDUs. In some examples the reordering/discard procedure comprises a reordering and discard procedure that sequences PDCP SDUs according to consecutive PDCP sequence numbers (SNs) and discards PDCP SDUs having PDCP SNs outside of a reordering window, with reordering window parameters set based on a bearer type for the particular radio bearer. For example, a first radio bearer may have a relatively high reliability target that may correspond to an acknowledged mode (AM) radio bearer reliability target, and the second radio bearer may have a relatively low reliability target that may correspond to an unacknowledged mode (UM) radio bearer reliability target. In some examples reordering window parameters at the PDCP layer may be selected based on the bearer type, in a manner similarly as discussed above. In some examples the first reordering window parameter and the second reordering window parameter are configured independently based at least in part on a delay or reliability target of the associated first radio bearer and second radio bearer. At block 620, the UE 115-b may perform cyphering and header compression procedures to decipher and decompress received SDUs.

Figure 7:
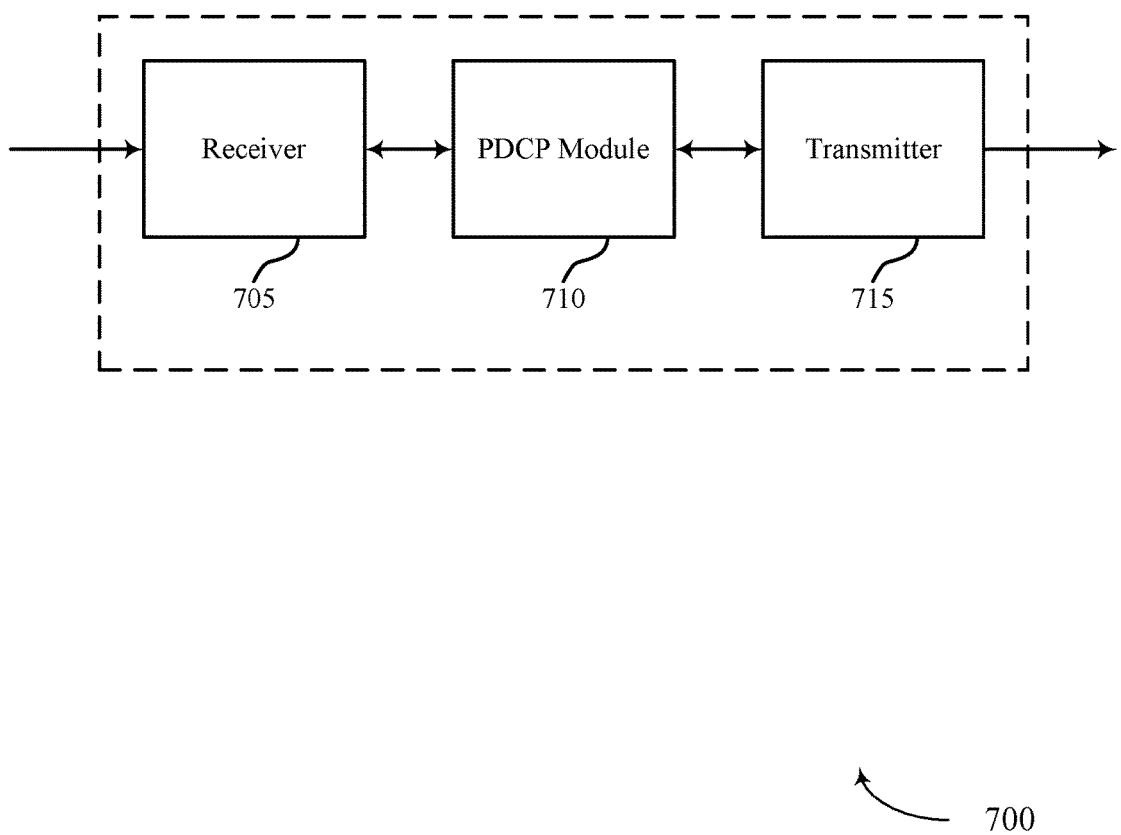
FIGS. 7-9 show block diagrams of a wireless device that supports PDCP reordering with eCCs, in accordance with various aspects of the present disclosure.

FIG. 7 shows a block diagram of a wireless device 700 configured for packet data convergence protocol reordering with eCCs, in accordance with various aspects of the present disclosure. Wireless device 700 may be an example of aspects of a base station 105 or a UE 115 described with reference to FIGS. 1-6. Wireless device 700 may include a receiver 705, a PDCP module 710, or a transmitter 715. Wireless device 700 may also include a processor. Each of these components may be in communication with each other.

The receiver 705 may receive information such as packets, user data, or control information associated with various information channels (e.g., control channels, data channels, and information related to packet data convergence protocol reordering with eCCs, etc.). Information may be passed on to the PDCP module 710, and to other components of wireless device 700.

The PDCP module 710 may receive a first plurality of packet data convergence protocol (PDCP) service data units (SDUs) at a PDCP layer for a first radio bearer carrying data with a first reliability target, receive a second plurality of PDCP SDUs at the PDCP layer for a second radio bearer carrying data with a second reliability target that is lower than the first reliability target, and manage a reordering procedure at the PDCP layer on the first plurality of PDCP SDUs and on the second plurality of PDCP SDUs. In some examples the first radio bearer may be carrying data with a first delay target, and the second radio bearer may be carrying the data with a second delay target that is shorter than the first delay target.

The transmitter 715 may transmit signals received from other components of wireless device 700. In some examples, the transmitter 715 may be collocated with the receiver 705 in a transceiver module. The transmitter 715 may include a single antenna, or it may include a plurality of antennas.

Figure 8:
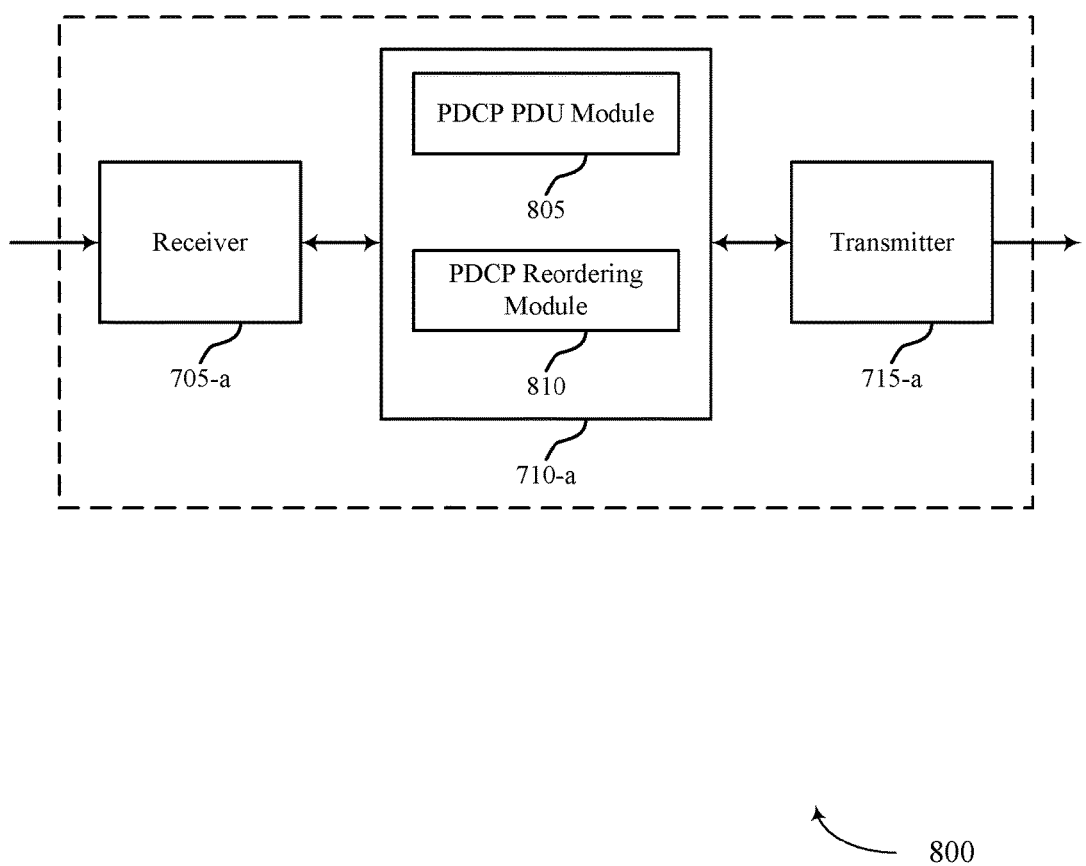

FIG. 8 shows a block diagram of a wireless device 800 for PDCP reordering with eCCs, in accordance with various aspects of the present disclosure. Wireless device 800 may be an example of aspects of a wireless device 700, a base station 105, or a UE 115 described with reference to FIGS. 1-7. Wireless device 800 may include a receiver 705-a, a PDCP module 710-a, or a transmitter 715-a. Wireless device 800 may also include a processor. Each of these components may be in communication with each other. The PDCP module 710-a may also include a PDCP PDU module 805, and a PDCP reordering module 810.

The receiver 705-a may receive information which may be passed on to PDCP module 710-a, and to other components of wireless device 800. The PDCP module 710-a may perform the operations described with reference to FIG. 7. The transmitter 715-a may transmit signals received from other components of wireless device 800.

The PDCP PDU module 805 may receive a first plurality of packet data convergence protocol (PDCP) service data units (SDUs) at a PDCP layer for a first radio bearer carrying data with a first reliability target as described with reference to FIGS. 2-6. The PDCP PDU module 805 may also receive a second plurality of PDCP SDUs at the PDCP layer for a second radio bearer carrying data with a second reliability target that is lower than the first reliability target. In some examples the first radio bearer may be carrying data with a first delay target, and the second radio bearer may be carrying the data with a second delay target that is shorter than the first delay target. In some examples, the first radio bearer may be a signaling radio bearer (SRB) and the second radio bearer may be a data radio bearer (DRB). In some examples, the first reliability target corresponds to an acknowledged mode (AM) radio bearer reliability target, and the second reliability target corresponds to an unacknowledged mode (UM) radio bearer reliability target. In some examples, for each radio bearer, performing a PDCP re-establishment procedure in cooperation with the PDCP module 710-a may include identifying one or both of a delay target or reliability target for the radio bearer. The PDCP PDU module 805 may also retain sequential PDCP sequence numbers (SNs) and hyperframe numbers (HFNs) established prior to the PDCP re-establishment procedure when the status PDU is configured.

The PDCP reordering module 810 may manage a reordering procedure at the PDCP layer on the first plurality of PDCP SDUs and on the second plurality of PDCP SDUs as described with reference to FIGS. 2-6. In some examples, the reordering procedure may include a reordering and discard procedure that sequences PDCP SDUs according to consecutive PDCP sequence numbers (SNs) and discards PDCP SDUs having PDCP SNs outside of a reordering window.

Figure 9:
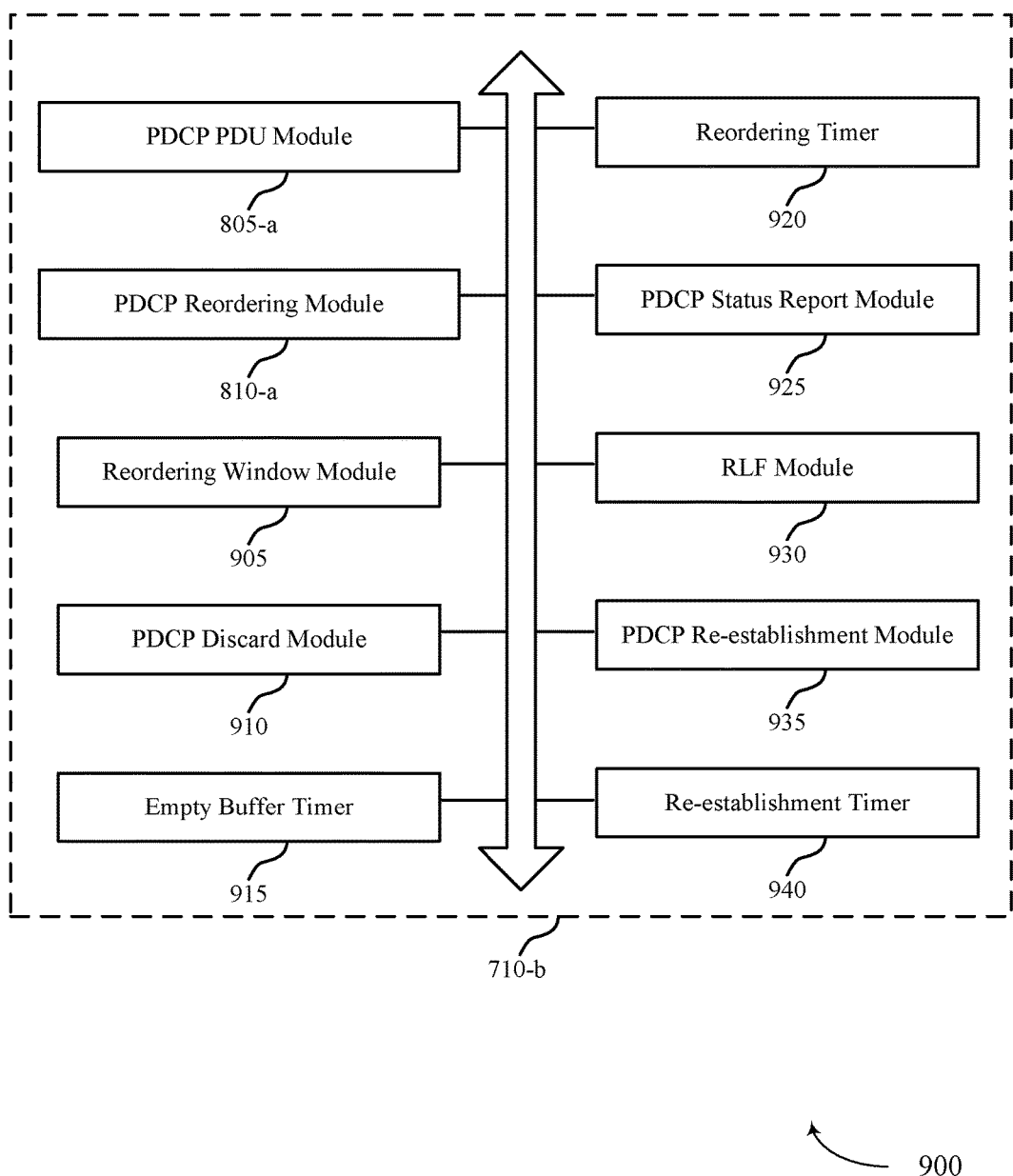

FIG. 9 shows a block diagram 900 of a PDCP module 710-b which may be a component of a wireless device 700 or a wireless device 800 for PDCP reordering with eCCs, in accordance with various aspects of the present disclosure. The PDCP module 710-b may be an example of aspects of a PDCP modules 710 described with reference to FIGS. 7-8. The PDCP module 710-b may include a PDCP PDU module 805-a, and a PDCP reordering module 810-a. Each of these modules may perform the functions described with reference to FIG. 8. The PDCP module 710-b may also include a reordering window module 905, a PDCP discard module 910, an empty buffer timer 915, a reordering timer 920, a PDCP status report module 925, a RLF module 930, a PDCP re-establishment module 935, and a re-establishment timer 940.

The reordering window module 905 may be configured such that managing the reordering procedure may include configuring a first PDCP reordering window parameter for a first radio bearer based at least in part on one or more of a first reliability target or a first delay target as described with reference to FIGS. 2-6. The reordering window module 905 may also configure a second PDCP reordering window parameter for a second radio bearer based at least in part on one or more of a second reliability target or a second delay target. In some examples, the first reordering window parameter and the second reordering window parameter are configured independently from each other based at least in part on a delay or reliability target of the associated first radio bearer or second radio bearer. In some examples, the first reordering window parameter and the second reordering window parameter each correspond to a range of PDCP sequence numbers (SNs) eligible for reordering, and the range of PDCP SNs of the first reordering window parameter may be larger than the range of PDCP SNs of the second reordering window parameter. The reordering window module 905 may also set a reordering timer based at least in part on a delay target or a reliability target of the associated first radio bearer or second radio bearer. The reordering window module 905 may also reset a reordering window associated with the received PDCP SDU radio bearer if a received PDCP SDU is received outside of the reordering window and an empty buffer timer has expired. In some examples, the first radio bearer may be a signaling radio bearer (SRB), and a first PDCP reordering window parameter for the first radio bearer may be configured to provide that received PDCP SDUs are retained irrespective of whether the PDCP SDUs are received in sequential order and irrespective of an elapsed time between receipt of PDCP SDUs.

The PDCP discard module 910 may be configured to discard one or more received PDCP SDUs received outside of the associated PDCP reordering window as described with reference to FIGS. 2-6. The PDCP discard module 910 may also discard a received PDCP SDU that is received outside of a reordering window if an empty buffer timer associated with the received PDCP SDU radio bearer has not expired.

The empty buffer timer 915 may be configured such that the reordering procedure may include initiating an empty buffer timer for a first or second radio bearer following receipt of a latest sequential PDCP SDU associated with the respective first radio bearer or second radio bearer as described with reference to FIGS. 2-6. In some examples, the empty buffer timer may be set based at least in part on one or more of a delay target or a reliability target of the associated first radio bearer and second radio bearer. The reordering timer 920 may be configured such that the reordering procedure may include initiating a reordering timer associated with the first radio bearer following receipt of a latest PDCP SDU associated with the first radio bearer as described with reference to FIGS. 2-6.

The PDCP status report module 925 may trigger a PDCP status report with a transmitter of the first radio bearer when a reordering timer has expired prior to receipt of a next sequential PDCP SDU relative to the latest received PDCP SDU as described with reference to FIGS. 2-6. The PDCP status report module 925 may also determine to configure a status protocol data unit (PDU) transmission that indicates PDCP SDUs that have been received at the receiver based at least in part on one or both of a delay target or a reliability target. The PDCP status report module 925 may also determine to configure a status PDU transmission for signaling radio bearers (SRBs), and for data radio bearers (DRBs) with a reliability target that is greater than a threshold.

The RLF module 930 may trigger a radio link failure (RLF) procedure for the first radio bearer when the reordering timer has expired prior to receipt of a next sequential PDCP SDU relative to the latest received PDCP SDU as described with reference to FIGS. 2-6. The RLF module 930 may also provide an indication that the one or more PDCP SDUs are missing to a radio resource control (RRC) layer. The RLF module 930 may also provide an indication that the one or more new PDCP SDUs are received to a radio resource control (RRC) layer.

The PDCP re-establishment module 935 may perform a PDCP re-establishment procedure for one or more of a first radio bearer or a second radio bearer, wherein the PDCP re-establishment procedure is selected based at least in part on a reliability target or a delay target for the first radio bearer or the second radio bearer as described with reference to FIGS. 2-6. The re-establishment timer 940 may be configured for reordering PDCP SDUs following initiation of a PDCP re-establishment procedure, and discontinuing reordering PDCP SDUs from prior to the initiation of a PDCP re-establishment procedure following expiration of the re-establishment timer as described with reference to FIGS. 2-6. In some examples, a duration of the re-establishment timer may be determined based at least in part on one or both of a delay target or a reliability target of a radio bearer.

Figure 10:
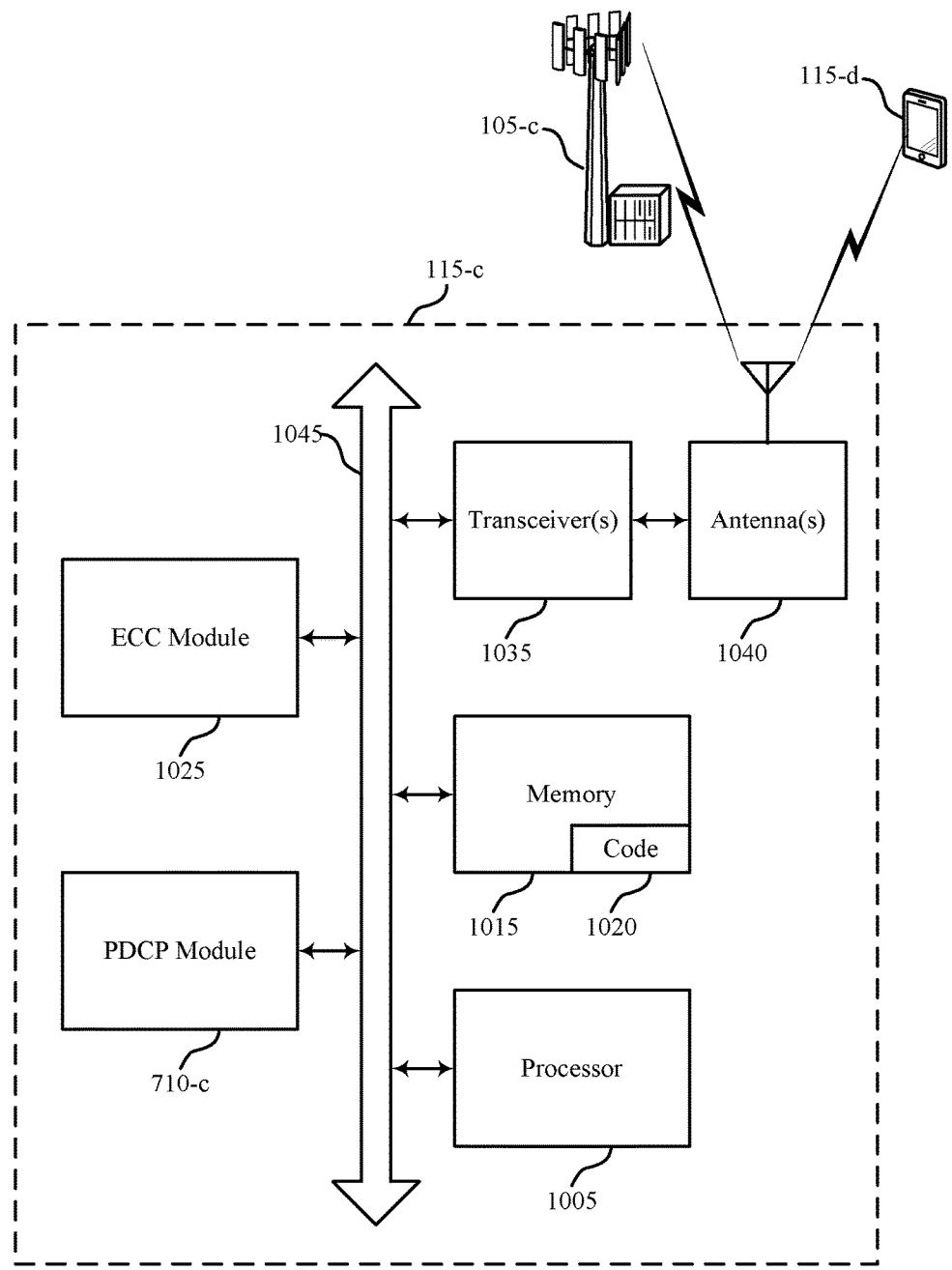
FIG. 10 illustrates a block diagram of a system including a device that supports PDCP reordering with eCCs, in accordance with various aspects of the present disclosure.

FIG. 10 shows a diagram of a system 1000 including a UE 115-c configured for packet data convergence protocol reordering with eCCs, in accordance with various aspects of the present disclosure. UE 115-c may be an example of aspects of a wireless device 700, a wireless device 800, or a UE 115 described with reference to FIGS. 1, 2 7, and 8. UE 115-c may include a PDCP module 710-c, which may be an example of aspects of PDCP modules 710 described with reference to FIGS. 7-9. UE 115-c may also include an eCC module 1025 that may manage eCC procedures for the UE 115-c. UE 115-c may also include components for bi-directional voice and data communications including components for transmitting communications and components for receiving communications. For example, UE 115-c may communicate bi-directionally with UE 115-d or base station 105-c.

UE 115-c may also include a processor 1005, and memory 1015 (including software/firmware code 1020), one or more transceiver(s) 1035, and one or more antenna(s) 1040, each of which may communicate, directly or indirectly, with one another (e.g., via bus 1045). The transceiver(s) 1035 may communicate bi-directionally, via the antenna(s) 1040 or wired or wireless links, with one or more networks, as described above. For example, the transceiver(s) 1035 may communicate bi-directionally with a base station 105-c or UE 115-d. The transceiver(s) 1035 may include a modem to modulate packets and provide the modulated packets to the antenna(s) 1040 for transmission, and to demodulate packets received from the antenna(s) 1040. While UE 115-c may include a single antenna 1040, UE 115-c may also have multiple antennas 1040 capable of concurrently transmitting or receiving multiple wireless transmissions.

The memory 1015 may include random access memory (RAM) and read only memory (ROM). The memory 1015 may store computer-readable, computer-executable software/firmware code 1020 including instructions that, when executed, cause the processor 1005 to perform various functions described herein (e.g., packet data convergence protocol reordering with eCCs, etc.). Alternatively, the software/firmware code 1020 may not be directly executable by the processor 1005 but cause a computer (e.g., when compiled and executed) to perform functions described herein. The processor 1005 may include an intelligent hardware device (e.g., a central processing unit (CPU), a microcontroller, an application specific integrated circuit (ASIC), etc.).

Figure 11:
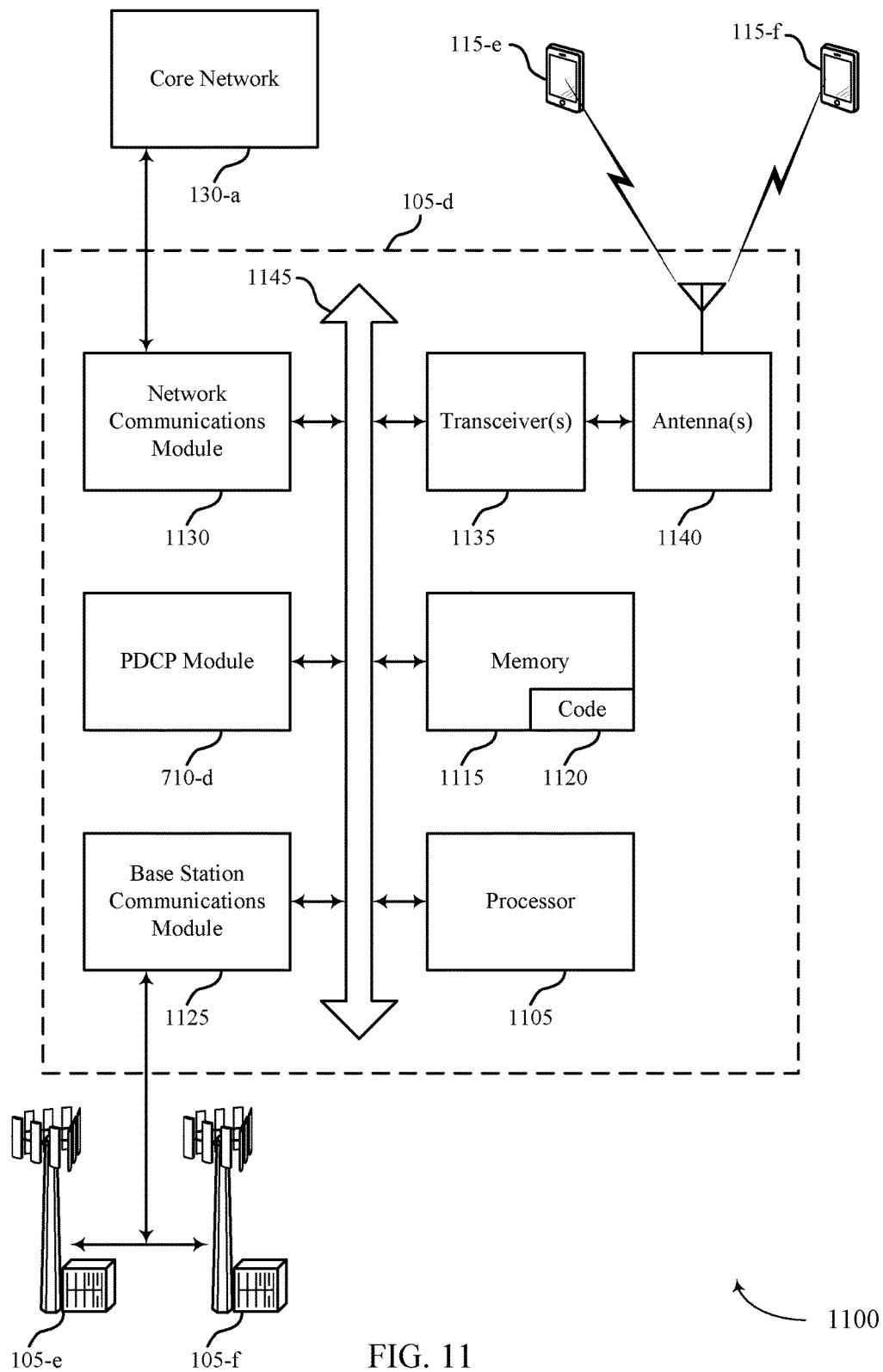
FIG. 11 illustrates a block diagram of a system including a base station that supports PDCP reordering with eCCs, in accordance with various aspects of the present disclosure.

FIG. 11 shows a diagram of a system 1100 including a base station 105-d configured for packet data convergence protocol reordering with eCCs, in accordance with various aspects of the present disclosure. Base station 105-d may be an example of aspects of a wireless device 700, a wireless device 800, or a base station 105 described with reference to FIGS. 1, 2, 7, 8, and 10. Base station 105-*d* may include a PDCP module 710-*d*, which may be an example of aspects of PDCP modules 710 described with reference to FIGS. 7-9. Base Station 105-*d* may also include components for bi-directional voice and data communications including components for transmitting communications and components for receiving communications. For example, base station 105-d may communicate bi-directionally with UE 115-*e* or UE 115-*f*.

In some cases, base station 105-*d* may have one or more wired backhaul links. Base station 105-*d* may have a wired backhaul link (e.g., S1 interface, etc.) to the core network 130. Base station 105-*d* may also communicate with other base stations 105, such as base station 105-*e* and base station 105-*f* via inter-base station backhaul links (e.g., an X2 interface). Each of the base stations 105 may communicate with UEs 115 using the same or different wireless communications technologies. In some cases, base station 105-*d* may communicate with other base stations such as 105-*e* or 105-*f* utilizing base station communication module 1125. In some examples, base station communication module 1125 may provide an X2 interface within a Long Term Evolution (LTE)/LTE-A wireless communication network technology to provide communication between some of the base stations 105. In some examples, base station 105-*d* may communicate with other base stations through core network 130. In some cases, base station 105-*d* may communicate with the core network 130 through network communications module 1130.

The base station 105-*d* may include a processor 1105, memory 1115 (including software/firmware code 1120), one or more transceiver(s) 1135, and one or more antenna(s) 1140, which each may be in communication, directly or indirectly, with one another (e.g., over bus system 1145). The transceiver(s) 1135 may be configured to communicate bi-directionally, via the antenna(s) 1140, with the UEs 115, which may be multi-mode devices. The transceiver(s) 1135 (or other components of the base station 105-*d*) may also be configured to communicate bi-directionally, via the antenna(s) 1140, with one or more other base stations (not shown). The transceiver(s) 1135 may include a modem configured to modulate the packets and provide the modulated packets to the antennas 1140 for transmission, and to demodulate packets received from the antennas 1140. The base station 105-*d* may include multiple transceivers 1135, each with one or more associated antenna(s) 1140. The transceiver(s) may be an example of a combined receiver 705 and transmitter 715 of FIG. 7.

The memory 1115 may include RAM and ROM. The memory 1115 may also store computer-readable, computer-executable software/firmware code 1120 containing instructions that are configured to, when executed, cause the processor 1110 to perform various functions described herein (e.g., packet data convergence protocol reordering with eCCs, call processing, database management, message routing, etc.). Alternatively, the code 1120 may not be directly executable by the processor 1105 but be configured to cause the computer, e.g., when compiled and executed, to perform functions described herein. The processor 1105 may include an intelligent hardware device, e.g., a CPU, a microcontroller, an ASIC, etc. The processor 1105 may include various special purpose processors such as encoders, queue processing modules, base band processors, radio head controllers, digital signal processor (DSPs), and the like.

The base station communication module 1125 may manage communications with other base stations 105. In some cases, a communications management module may include a controller or scheduler for controlling communications with UEs 115 in cooperation with other base stations 105. For example, the base station communication module 1125 may coordinate scheduling for transmissions to UEs 115 for various interference mitigation techniques such as beamforming or joint transmission.

The components of wireless device 700, wireless device 800, and PDCP modules 710 may, individually or collectively, be implemented with at least one ASIC adapted to perform some or all of the applicable functions in hardware. Alternatively, the functions may be performed by one or more other processing units (or cores), on at least one integrated circuit (IC). In other examples, other types of integrated circuits may be used (e.g., Structured/Platform ASICs, a field programmable gate array (FPGA), or another semi-custom IC), which may be programmed in any manner known in the art. The functions of each unit may also be implemented, in whole or in part, with instructions embodied in a memory, formatted to be executed by one or more general or application-specific processors.

Figure 12:
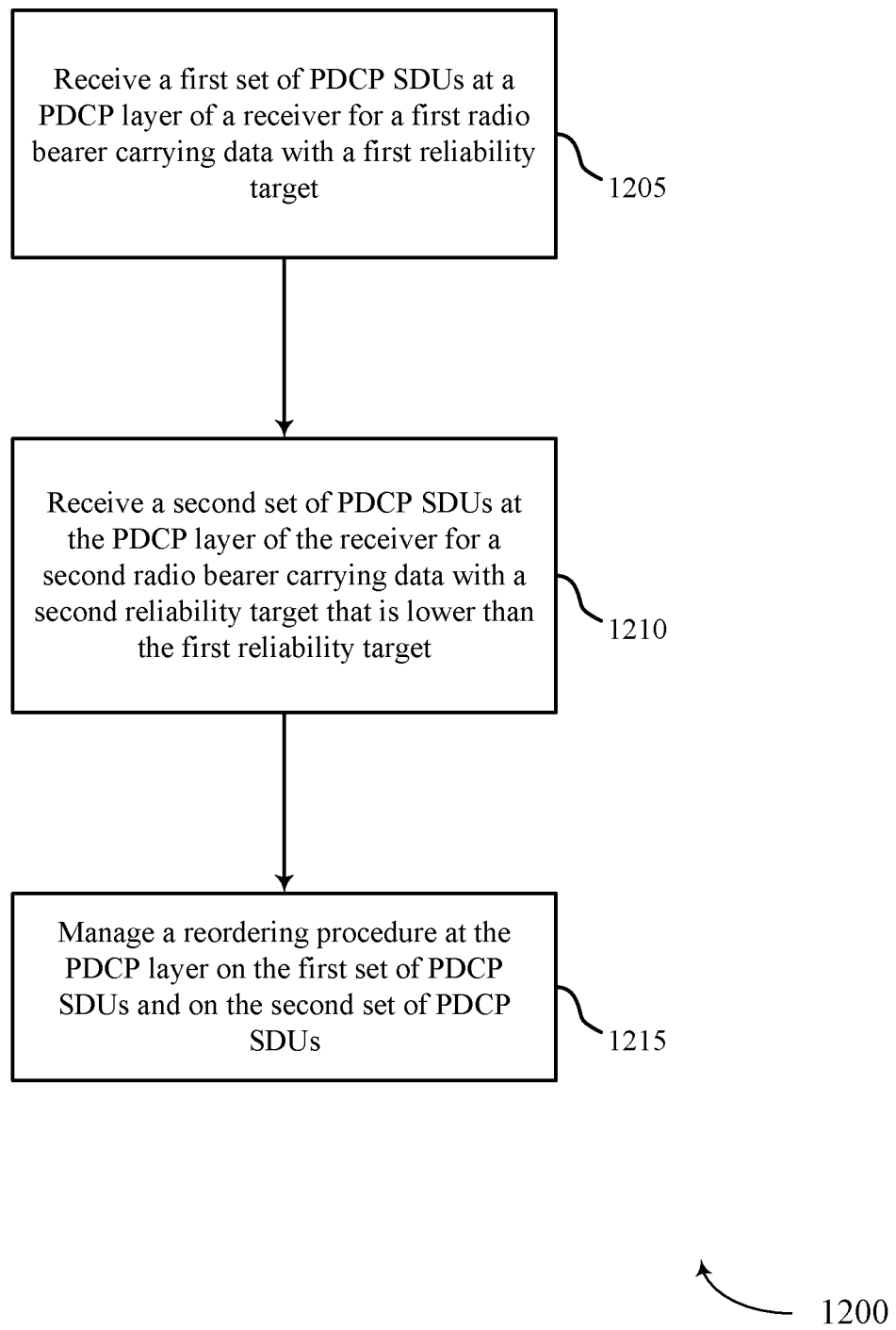
FIGS. 12-17 illustrate methods for PDCP reordering with eCCs, in accordance with various aspects of the present disclosure.

FIG. 12 shows a flowchart illustrating a method 1200 for PDCP reordering with eCCs, in accordance with various aspects of the present disclosure. The operations of method 1200 may be implemented by a device, such as a UE 115 or base station 105, or their respective components, as described with reference to FIGS. 1-11. For example, the operations of method 1200 may be performed by the PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware.

At block 1205, the device may receive a first plurality of PDCP SDUs at a PDCP layer of a receiver for a first radio bearer carrying data with a first reliability target, as described with reference to FIGS. 2-6. Operations of block 1205 may be performed by a PDCP PDU module 805 as described with reference to FIG. 8 or 9.

At block 1210, the device may receive a second plurality of PDCP SDUs at the PDCP layer of the receiver for a second radio bearer carrying data with a second reliability target that is lower than the first reliability target, as described with reference to FIGS. 2-6. Operations of block 1210 may be performed by a PDCP PDU module 805 as described with reference to FIG. 8 or 9.

At block 1215, the device may manage a reordering procedure at the PDCP layer on the first plurality of PDCP SDUs and on the second plurality of PDCP SDUs, as described with reference to FIGS. 2-6. Operations of block 1215 may be performed by a PDCP reordering module 810 as described with reference to FIG. 8 or 9.

Figure 13:
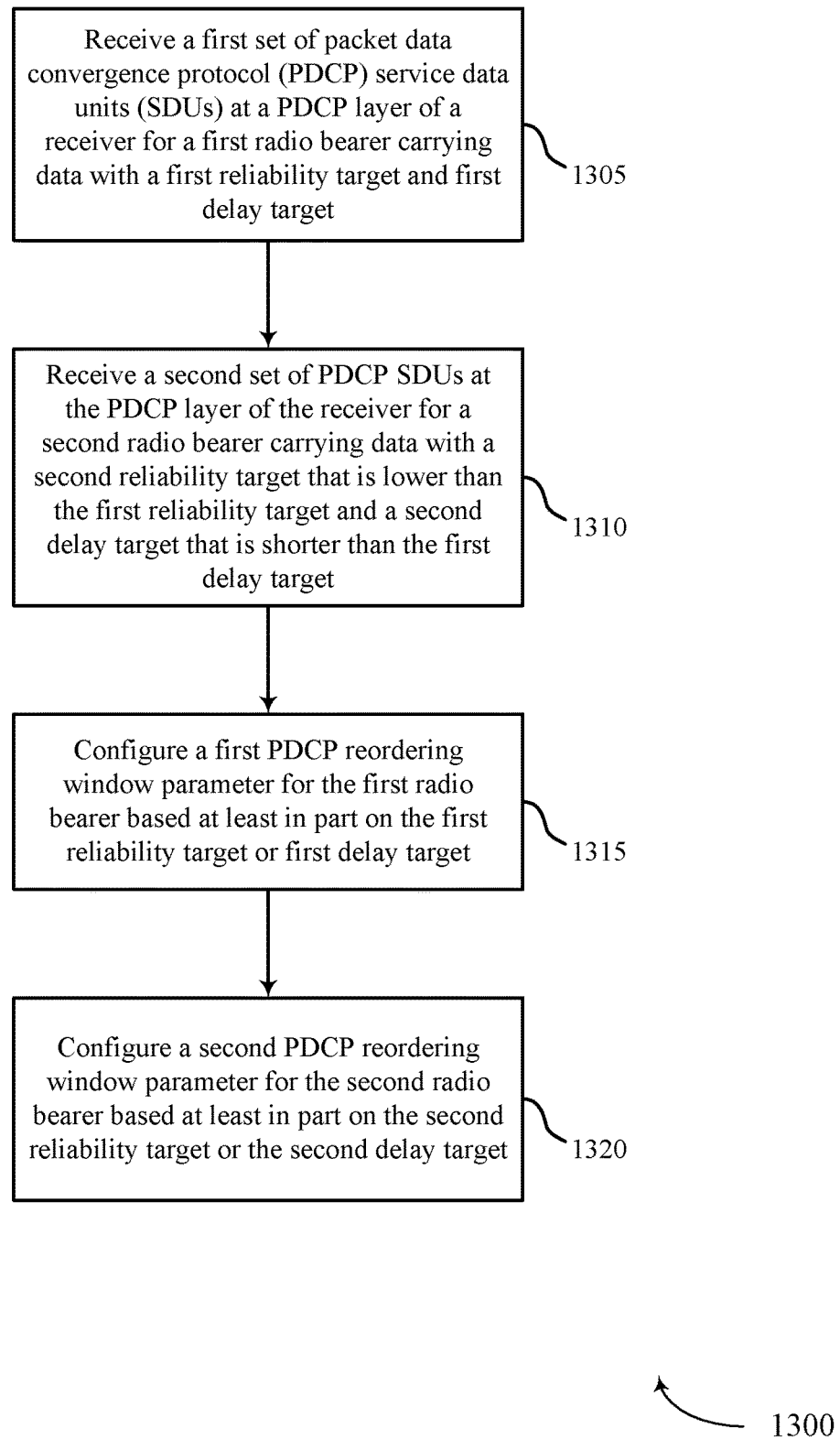

FIG. 13 shows a flowchart illustrating a method 1300 for PDCP reordering with eCCs, in accordance with various aspects of the present disclosure. The operations of method 1300 may be implemented by a device, such as a UE 115 or base station 105, or their respective components, as described with reference to FIGS. 1-11. For example, the operations of method 1300 may be performed by a PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware. The method 1300 may also incorporate aspects of method 1200 of FIG. 12.

At block 1305, the device may receive a first plurality of PDCP SDUs at a PDCP layer of a receiver for a first radio bearer carrying data with a first reliability target and first delay target, as described with reference to FIGS. 2-6. Operations of block 1305 may be performed by a PDCP PDU module 805 as described with reference to FIG. 8 or 9.

At block 1310, the device may receive a second plurality of PDCP SDUs at the PDCP layer of the receiver for a second radio bearer carrying data with a second reliability target that is lower than the first reliability target and a second delay target that is shorter than the first delay target, as described with reference to FIGS. 2-6. Operations of block 1310 may be performed by a PDCP PDU module 805 as described with reference to FIG. 8 or 9.

At block 1315, the device may configure a first PDCP reordering window parameter for the first radio bearer based at least in part on the first reliability target or the first delay target, as described with reference to FIGS. 2-6. Operations of block 1315 may be performed by a PDCP reordering module 810 as described with reference to FIG. 8 or a reordering window module 905 as described with reference to FIG. 9.

At block 1320, the device may configure a second PDCP reordering window parameter for the second radio bearer based at least in part the second reliability target or the second delay target, as described with reference to FIGS. 2-6. Operations of block 1320 may be performed by a PDCP reordering module 810 as described with reference to FIG. 8 or a reordering window module 905 as described with reference to FIG. 9.

Figure 14:
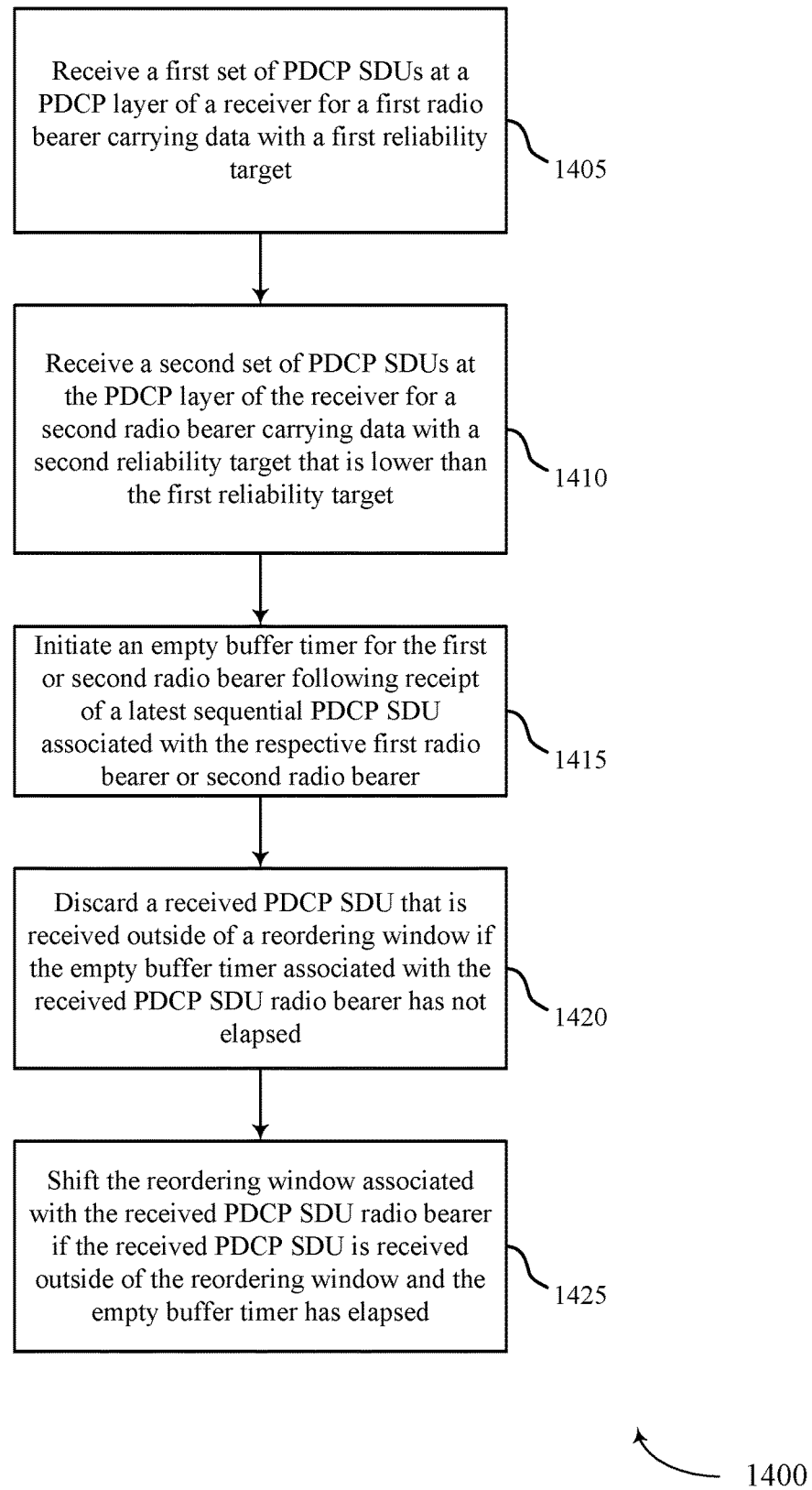

FIG. 14 shows a flowchart illustrating a method 1400 for PDCP reordering with eCCs, in accordance with various aspects of the present disclosure. The operations of method 1400 may be implemented by a device, such as a UE 115 or base station 105, or their respective components, as described with reference to FIGS. 1-11. For example, the operations of method 1400 may be performed by a PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware. The method 1400 may also incorporate aspects of methods 1200, and 1300 of FIGS. 12-13.

At block 1405, the device may receive a first plurality of PDCP SDUs at a PDCP layer of a receiver for a first radio bearer carrying data with a first reliability target, as described with reference to FIGS. 2-6. Operations of block 1405 may be performed by a PDCP PDU module 805 as described with reference to FIG. 8 or 9.

At block 1410, the device may receive a second plurality of PDCP SDUs at the PDCP layer of the receiver for a second radio bearer carrying data with a second reliability target that is lower than the first reliability target, as described with reference to FIGS. 2-6. Operations of block 1410 may be performed by a PDCP PDU module 805 as described with reference to FIG. 8 or 9.

At block 1415, the device may initiate an empty buffer timer for the first or second radio bearer following receipt of a latest sequential PDCP SDU associated with the respective first radio bearer or second radio bearer, as described with reference to FIGS. 2-6. Operations of block 1415 may be performed by a PDCP reordering module 810 as described with reference to FIG. 8 or 9.

At block 1420, the device may discard a received PDCP SDU that is received outside of a reordering window if the empty buffer timer associated with the received PDCP SDU radio bearer has not expired, as described with reference to FIGS. 2-6. Operations of block 1420 may be performed by a PDCP discard module 910 as described with reference to FIG. 9.

At block 1425, the device may shift the reordering window associated with the received PDCP SDU radio bearer if the received PDCP SDU is received outside of the reordering window and the empty buffer timer has expired, as described with reference to FIGS. 2-6. Operations of block 1425 may be performed by a reordering window module 905 as described with reference to FIG. 9.

Figure 15:
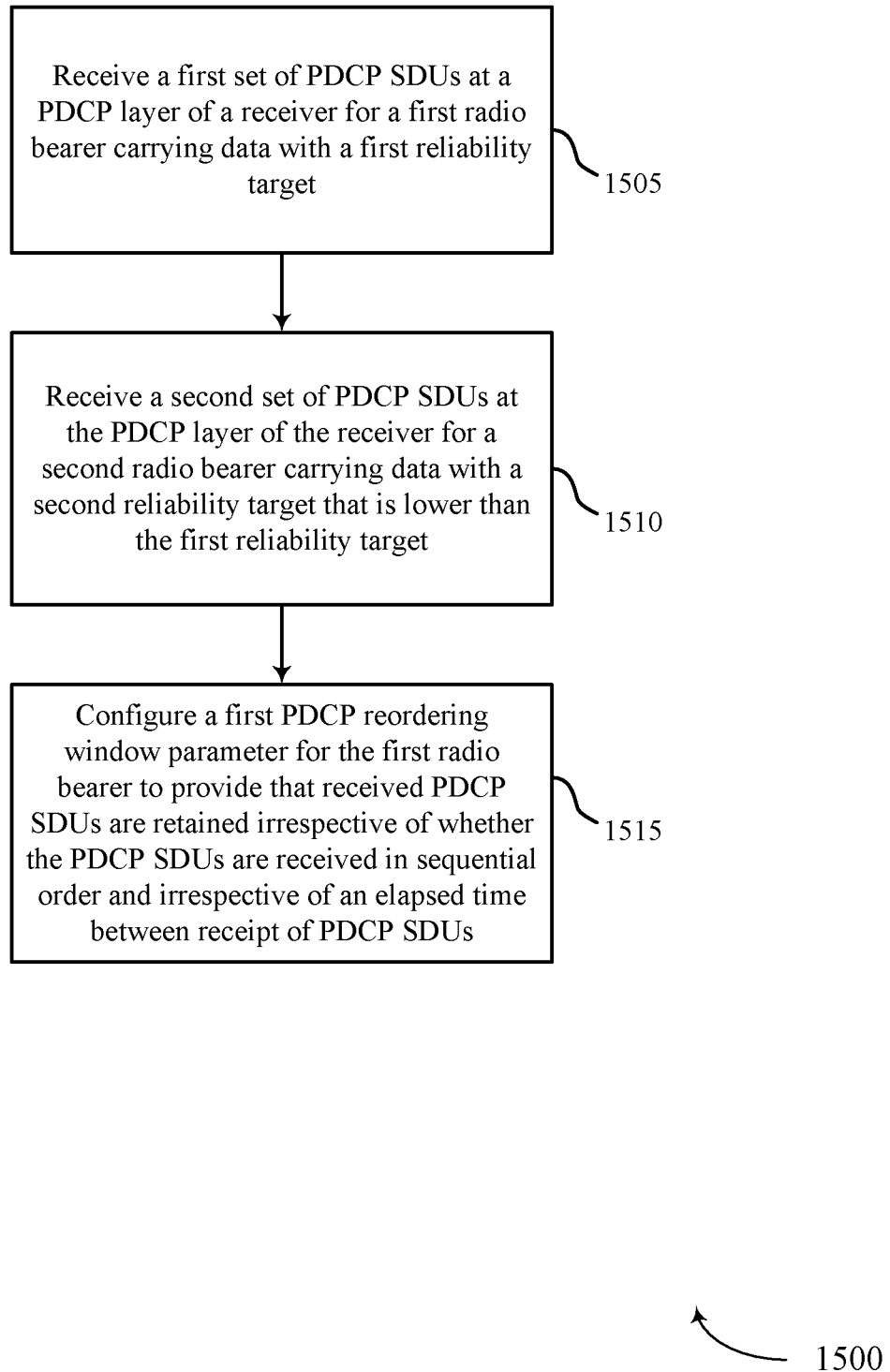

FIG. 15 shows a flowchart illustrating a method 1500 for PDCP reordering with eCCs, in accordance with various aspects of the present disclosure. The operations of method 1500 may be implemented by a device, such as a UE 115 or base station 105, or their respective components, as described with reference to FIGS. 1-11. For example, the operations of method 1500 may be performed by a PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware. The method 1500 may also incorporate aspects of methods 1200, 1300, and 1400 of FIGS. 12-14.

At block 1505, the device may receive a first plurality of PDCP SDUs at a PDCP layer of a receiver for a first radio bearer carrying data with a first reliability target, as described with reference to FIGS. 2-6. Operations of block 1505 may be performed by a PDCP PDU module 805 as described with reference to FIG. 8 or 9.

At block 1510, the device may receive a second plurality of PDCP SDUs at the PDCP layer of the receiver for a second radio bearer carrying data with a second reliability target that is lower than the first reliability target, as described with reference to FIGS. 2-6. Operations of block 1510 may be performed by a PDCP PDU module 805 as described with reference to FIG. 8 or 9.

At block 1515, the device may manage a reordering procedure at the PDCP layer to configure a first PDCP reordering window parameter for the first radio bearer to provide that received PDCP SDUs are retained irrespective of whether the PDCP SDUs are received in sequential order and irrespective of an expired time between receipt of PDCP SDUs, as described with reference to FIGS. 2-6. Operations of block 1515 may be performed by a PDCP reordering module 810 as described with reference to FIG. 8 or 9. In some cases, the first radio bearer may be a signaling radio bearer (SRB). In some cases, the reordering procedure may include initiating a reordering timer associated with the first radio bearer following receipt of a latest PDCP SDU associated with the first radio bearer, and the device may trigger a PDCP status report (e.g., using PDCP status report module 925 as described with reference to FIG. 9) with a transmitter of the first radio bearer when the reordering timer has expired prior to receipt of a next sequential PDCP SDU relative to the latest received PDCP SDU, as described with reference to FIGS. 2-6.

Figure 16:
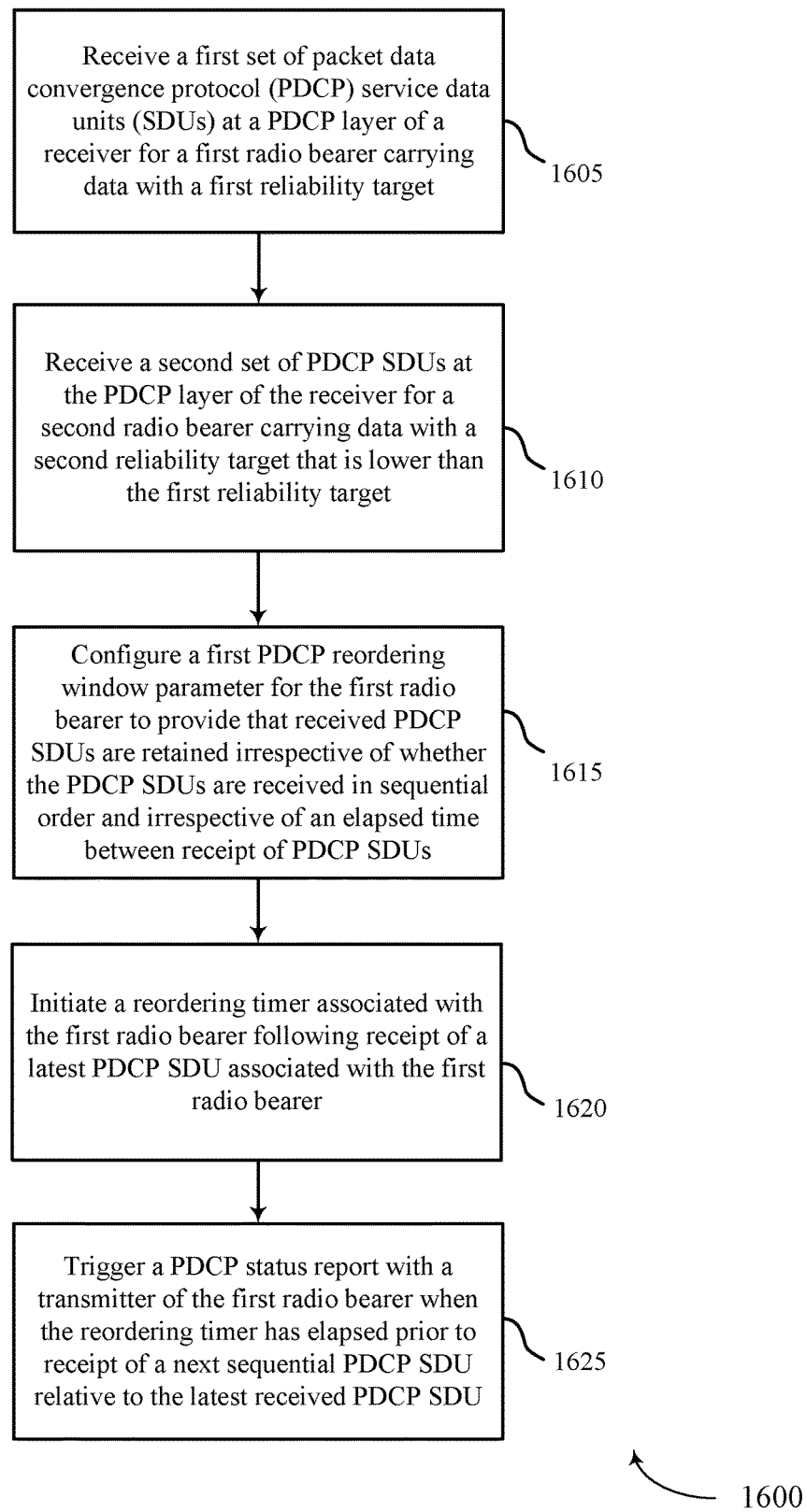

FIG. 16 shows a flowchart illustrating a method 1600 for PDCP reordering with eCCs, in accordance with various aspects of the present disclosure. The operations of method 1600 may be implemented by a device, such as a UE 115 or base station 105, or their respective components, as described with reference to FIGS. 1-11. For example, the operations of method 1600 may be performed by a PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware. The method 1600 may also incorporate aspects of methods 1200, 1300, 1400, and 1500 of FIGS. 12-15.

At block 1605, the device may receive a first plurality of PDCP SDUs at a PDCP layer of a receiver for a first radio bearer carrying data with a first reliability target, as described with reference to FIGS. 2-6. Operations of block 1605 may be performed by a PDCP PDU module 805 as described with reference to FIG. 8 or 9.

At block 1610, the device may receive a second plurality of PDCP SDUs at the PDCP layer of the receiver for a second radio bearer carrying data with a second reliability target that is lower than the first reliability target, as described with reference to FIGS. 2-6. Operations of block 1610 may be performed by the PDCP PDU module 805 as described with reference to FIG. 8 or 9.

At block 1615, the device may manage a reordering procedure at the PDCP layer to configure a first PDCP reordering window parameter for the first radio bearer to provide that received PDCP SDUs are retained irrespective of whether the PDCP SDUs are received in sequential order and irrespective of an elapsed time between receipt of PDCP SDUs, as described with reference to FIGS. 2-6. Operations of block 1615 may be performed by a PDCP reordering module 810 as described with reference to FIG. 8 or 9. In some cases, the first radio bearer may be a signaling radio bearer (SRB).

At block 1620, the device may initiate a reordering timer associated with the first radio bearer following receipt of a latest PDCP SDU associated with the first radio bearer, as described with reference to FIGS. 2-6. Operations of block 1620 may be performed by a PDCP reordering module 810 or a reordering timer 920 as described with reference to FIG. 8 or 9.

At block 1625, the device may trigger a PDCP status report with a transmitter of the first radio bearer when the reordering timer has expired prior to receipt of a next sequential PDCP SDU relative to the latest received PDCP SDU, as described with reference to FIGS. 2-6. Operations of block 1625 may be performed by a PDCP status report module 925 as described with reference to FIG. 9.

Figure 17:
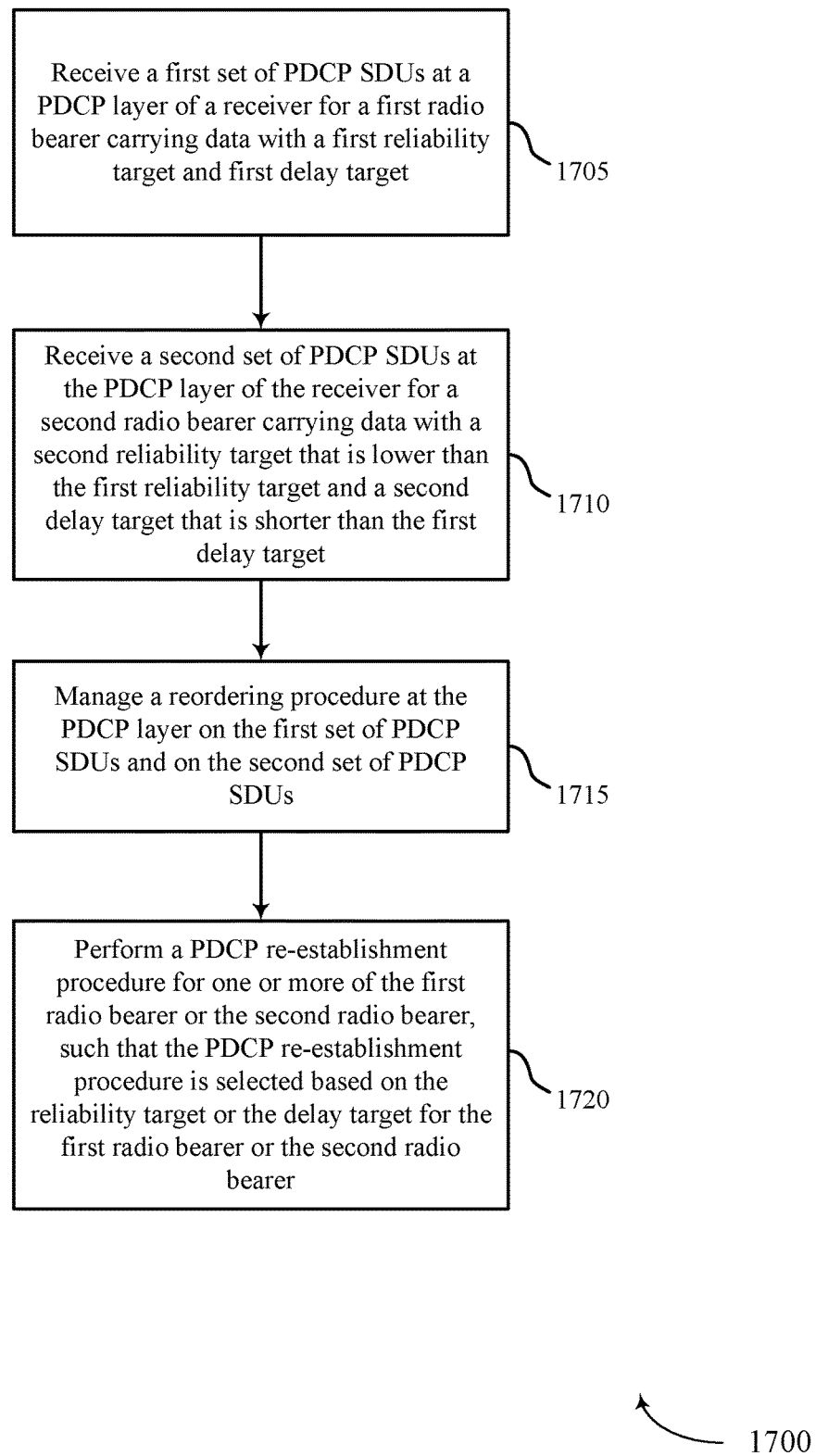

FIG. 17 shows a flowchart illustrating a method 1700 for PDCP reordering with eCCs, in accordance with various aspects of the present disclosure. The operations of method 1700 may be implemented by a device, such as a UE 115 or base station 105, or their respective components, as described with reference to FIGS. 1-11. For example, the operations of method 1700 may be performed by a PDCP module 710 as described with reference to FIGS. 7-11. In some examples, a device may execute a set of instructions to control the functional elements of the device to perform the functions described below. Additionally or alternatively, the device may perform aspects the functions described below using special-purpose hardware. The method 1700 may also incorporate aspects of methods 1200, 1300, 1400, 1500, and 1600 of FIGS. 12-16.

At block 1705, the device may receive a first plurality of PDCP SDUs at a PDCP layer of a receiver for a first radio bearer carrying data with a first reliability target and first delay target, as described with reference to FIGS. 2-6. Operations of block 1705 may be performed by a PDCP PDU module 805 as described with reference to FIG. 8 or 9.

At block 1710, the device may receive a second plurality of PDCP SDUs at the PDCP layer of the receiver for a second radio bearer carrying data with a second reliability target that is lower than the first reliability target and a second delay target that is shorter than the first delay target, as described with reference to FIGS. 2-6. Operations of block 1710 may be performed by a PDCP PDU module 805 as described with reference to FIG. 8 or 9.

At block 1715, the device may manage a reordering procedure at the PDCP layer on the first plurality of PDCP SDUs and on the second plurality of PDCP SDUs, as described with reference to FIGS. 2-6. Operations of block 1715 may be performed by a PDCP reordering module 810 as described with reference to FIG. 8 or 9.

At block 1720, the device may perform a PDCP re-establishment procedure for one or both of the first radio bearer or the second radio bearer, such that the PDCP re-establishment procedure is selected based at least in part on the reliability target or the delay target for the first radio bearer or the second radio bearer, as described with reference to FIGS. 2-6. Operations of block 1720 may be performed by a PDCP re-establishment module 935 as described with reference to FIG. 9.

Thus, methods 1200, 1300, 1400, 1500, 1600, and 1700 may provide for packet data convergence protocol reordering with eCCs. It should be noted that methods 1200, 1300, 1400, 1500, 1600, and 1700 describe possible implementation, and that the operations and the steps may be rearranged or otherwise modified such that other implementations are possible. In some examples, aspects from two or more of the methods 1200, 1300, 1400, 1500, 1600, and 1700 may be combined.

The description herein provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. Also, features described with respect to some examples may be combined in other examples.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM). An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are new releases of Universal Mobile Telecommunications System (UMTS) that use E-UTRA. UTRA, E-UTRA, Universal Mobile Telecommunications System (UMTS), LTE, LTE-A, and Global System for Mobile communications (GSM) are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" is a 3GPP term that can be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for frequency division duplex (FDD) (e.g., frame structure type 1) and TDD (e.g., frame structure type 2).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can include RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving, at a packet data convergence (PDCP) layer of a receiving device and from a lower protocol layer of the receiving device, a first plurality of PDCP service data units (SDUs) for a first radio bearer carrying data from a transmitting device with a first reliability target;
   receiving, at the PDCP layer of the receiving device and from the lower protocol layer of the receiving device, a second plurality of PDCP SDUs for a second radio bearer carrying data from the transmitting device with a second reliability target that is lower than the first reliability target; and
   managing, at the PDCP layer of the receiving device, a reordering procedure on the first plurality of PDCP SDUs received from the lower protocol layer of the receiving device and on the second plurality of PDCP SDUs received from the lower protocol layer of the receiving device to generate a plurality of reordered PDCP SDUs, wherein the reordering procedure comprises:
   initiating an empty buffer timer for the first radio bearer or the second radio bearer following receipt of a latest sequential PDCP SDU associated with the respective first radio bearer or second radio bearer, the respective first radio bearer or second radio bearer having an associated reordering window;
   discarding a received PDCP SDU that is received outside of the associated reordering window if the empty buffer timer has not expired; and
   shifting the associated reordering window if the received PDCP SDU is received outside of the associated reordering window and the empty buffer timer has expired.

2. The method of claim 1, wherein the first radio bearer is carrying data with a first delay target, and the second radio bearer is carrying data with a second delay target that is shorter than the first delay target.

3. The method of claim 2, wherein managing the reordering procedure comprises:
   configuring a first PDCP reordering window parameter for the first radio bearer based at least in part on the first reliability target or the first delay target; and
   configuring a second PDCP reordering window parameter for the second radio bearer based at least in part on the second reliability target or the second delay target.

4. The method of claim 3, wherein the first PDCP reordering window parameter and the second PDCP reordering window parameter are configured independently from each other.

5. The method of claim 3, wherein the first PDCP reordering window parameter and the second PDCP reordering window parameter each correspond to a range of PDCP sequence numbers (SNs) eligible for reordering, and wherein the range of PDCP SNs of the first reordering window parameter is larger than the range of PDCP SNs of the second reordering window parameter.

6. The method of claim 2, further comprising:
   performing a PDCP re-establishment procedure for one or both of the first radio bearer or the second radio bearer, wherein the PDCP re-establishment procedure is selected based at least in part on the first reliability target or the first delay target for the first radio bearer, or the second reliability target or the second delay target second radio bearer.

7. The method of claim 6, wherein, for each radio bearer, performing the PDCP re-establishment procedure comprises:
identifying one or both of the respective delay target or the respective reliability target for the radio bearer;
configuring a status protocol data unit (PDU) transmission that indicates PDCP SDUs that have been received at the receiver based at least in part on one or both of the respective delay target or the respective reliability target;
retaining sequential PDCP sequence numbers (SNs) and hyperframe numbers (HFNs) established prior to the PDCP re-establishment procedure in response to the configuring of the status PDU; and
wherein managing the reordering procedure at the PDCP layer further comprises configuring a re-establishment timer for reordering PDCP SDUs following initiation of the PDCP re-establishment procedure, and discontinuing reordering PDCP SDUs from prior to the initiation of the PDCP re-establishment procedure following an expiration of the re-establishment timer.

8. The method of claim 7, wherein determining to configure the status PDU transmission comprises configuring the status PDU transmission for signaling radio bearers (SRBs) and for data radio bearers (DRBs) with a reliability target that is greater than a threshold.

9. The method of claim 7, wherein a duration of the re-establishment timer is determined based at least in part on one or both of the respective delay target or the respective reliability target of the radio bearer.

10. The method of claim 1, wherein the reordering procedure comprises a reordering and discard procedure at the PDCP layer of the receiving device that sequences PDCP SDUs according to consecutive PDCP sequence numbers (SNs) and discards PDCP SDUs having PDCP SNs outside of a reordering window.

11. The method of claim 1, wherein the first radio bearer is a signaling radio bearer (SRB) and the second radio bearer is a data radio bearer (DRB).

12. The method of claim 1, wherein the first reliability target corresponds to an acknowledged mode (AM) radio bearer reliability target, and the second reliability target corresponds to an unacknowledged mode (UM) radio bearer reliability target.

13. The method of claim 1, wherein the empty buffer timer is set based at least in part on one or both of a delay target or the reliability target of the respective first radio bearer or second radio bearer.

14. The method of claim 1, wherein the first radio bearer is a signaling radio bearer (SRB), and wherein managing the reordering procedure comprises:
configuring a first PDCP reordering window parameter for the first radio bearer such that received PDCP SDUs are retained irrespective of whether the PDCP SDUs are received in sequential order and irrespective of an elapsed time between receipt of PDCP SDUs.

15. The method of claim 14, wherein the reordering procedure comprises:
initiating a reordering timer associated with the first radio bearer following receipt of a latest PDCP SDU associated with the first radio bearer; and
triggering a PDCP status report with the transmitting device in response to an expiration of the reordering timer prior to receipt of a next sequential PDCP SDU relative to the latest received PDCP SDU.

16. The method of claim 14, wherein the reordering procedure comprises:
initiating a reordering timer associated with the first radio bearer following receipt of a latest PDCP SDU associated with the first radio bearer; and
triggering a radio link failure (RLF) procedure for the first radio bearer in response to an expiration of the reordering timer prior to receipt of a next sequential PDCP SDU relative to the latest received PDCP SDU.

17. The method of claim 16, wherein triggering the RLF procedure further comprises:
determining that one or more PDCP SDUs are missing from the first plurality of PDCP SDUs; and
providing an indication that the one or more PDCP SDUs are missing to a radio resource control (RRC) layer.

18. The method of claim 16, wherein triggering the RLF procedure comprises:
determining that one or more new PDCP SDUs for the first radio bearer are received after the reordering timer has expired; and
providing to a radio resource control (RRC) layer an indication that the one or more new PDCP SDUs are received.

19. An apparatus for wireless communication, comprising:
a processor;
memory in communication with the processor; and
instructions stored in the memory and executable by the processor to cause the apparatus to:
receive, at a packet data convergence (PDCP) layer of a receiving device and from a lower protocol layer of the receiving device, a first plurality of PDCP service data units (SDUs) for a first radio bearer carrying data from a transmitting device with a first reliability target;
receive, at the PDCP layer of the receiving device and from the lower protocol layer of the receiving device, a second plurality of PDCP SDUs for a second radio bearer carrying data from the transmitting device with a second reliability target that is lower than the first reliability target;
manage, at the PDCP layer of the receiving device, a reordering procedure on the first plurality of PDCP SDUs received from the lower protocol layer of the receiving device and on the second plurality of PDCP SDUs received from the lower protocol layer of the receiving device to generate a plurality of reordered PDCP SDUs;
initiate an empty buffer timer for the first radio bearer or the second radio bearer following receipt of a latest sequential PDCP SDU associated with the respective first radio bearer or second radio bearer, the respective first radio bearer or second radio bearer having an associated reordering window;
discard a received PDCP SDU that is received outside of the associated reordering window if the empty buffer timer has not expired; and
shift the associated reordering window if the received PDCP SDU is received outside of the associated reordering window and the empty buffer timer has expired.

20. The apparatus of claim 19, wherein the first radio bearer is carrying data with a first delay target, and the second radio bearer is carrying data with a second delay target that is shorter than the first delay target.

21. The apparatus of claim 20, wherein the instructions are executable by the processor to cause the apparatus to:
configure a first PDCP reordering window parameter for the first radio bearer based at least in part on the first reliability target or the first delay target; and
configure a second PDCP reordering window parameter for the second radio bearer based at least in part on the second reliability target or the second delay target.

22. The apparatus of claim 20, wherein the instructions are executable by the processor to cause the apparatus to:
perform a PDCP re-establishment procedure for one or both of the first radio bearer or the second radio bearer, wherein the PDCP re-establishment procedure is selected based at least in part on the first reliability target or the first delay target for the first radio bearer, or the second reliability target or the second delay target for second radio bearer.

23. The apparatus of claim 22, wherein for each radio bearer, the instructions are executable by the processor to cause the apparatus to:
identify one or both of the respective delay target or the respective reliability target for the radio bearer;
configure a status protocol data unit (PDU) transmission that indicates PDCP SDUs that have been received at the receiver based at least in part on one or both of the respective delay target or the respective reliability target;
retain sequential PDCP sequence numbers (SNs) and hyperframe numbers (HFNs) established prior to the PDCP re-establishment procedure in response to the configuring of the status PDU; and
configure a re-establishment timer for reordering PDCP SDUs following initiation of the PDCP re-establishment procedure, and discontinuing reordering PDCP SDUs from prior to the initiation of the PDCP re-establishment procedure following an expiration of the re-establishment timer.

24. The apparatus of claim 19, wherein the reordering procedure comprises a reordering and discard procedure at the PDCP layer of the receiving device that sequences PDCP SDUs according to consecutive PDCP sequence numbers (SNs) and discards PDCP SDUs having PDCP SNs outside of a reordering window.

25. The apparatus of claim 19, wherein the first radio bearer is a signaling radio bearer (SRB), and wherein the instructions are executable by the processor to cause the apparatus to:
configure a first PDCP reordering window parameter for the first radio bearer such that received PDCP SDUs are retained irrespective of whether the PDCP SDUs are received in sequential order and irrespective of an elapsed time between receipt of PDCP SDUs.

26. An apparatus for wireless communication, comprising:
means for receiving, at a packet data convergence (PDCP) layer of a receiving device and from a lower protocol layer of the receiving device, a first plurality of PDCP service data units (SDUs) for a first radio bearer carrying data from a transmitting device with a first reliability target;
means for receiving, at the PDCP layer of the receiving device and from the lower protocol layer of the receiving device, a second plurality of PDCP SDUs for a second radio bearer carrying data from the transmitting device with a second reliability target that is lower than the first reliability target;
means for managing, at the PDCP layer of the receiving device, a reordering procedure on the first plurality of PDCP SDUs received from the lower protocol layer of the receiving device and on the second plurality of PDCP SDUs received from the lower protocol layer of the receiving device to generate a plurality of reordered PDCP SDUs;
means for initiating an empty buffer timer for the first radio bearer or the second radio bearer following receipt of a latest sequential PDCP SDU associated with the respective first radio bearer or second radio bearer, the respective first radio bearer or second radio bearer having an associated reordering window;
means for discarding a received PDCP SDU that is received outside of the associated reordering window if the empty buffer timer has not expired; and
means for shifting the associated reordering window if the received PDCP SDU is received outside of the associated reordering window and the empty buffer timer has expired.

27. A non-transitory computer-readable medium storing code for wireless communication, the code comprising instructions executable to:
receive, at a packet data convergence (PDCP) layer of a receiving device and from a lower protocol layer of the receiving device, a first plurality of PDCP service data units (SDUs) for a first radio bearer carrying data from a transmitting device with a first reliability target;
receive, at the PDCP layer of the receiving device and from the lower protocol layer of the receiving device, a second plurality of PDCP SDUs for a second radio bearer carrying data from the transmitting device with a second reliability target that is lower than the first reliability target;
manage, at the PDCP layer of the receiving device, a reordering procedure on the first plurality of PDCP SDUs received from the lower protocol layer of the receiving device and on the second plurality of PDCP SDUs received from the lower protocol layer of the receiving device to generate a plurality of reordered PDCP SDUs;
initiate an empty buffer timer for the first radio bearer or the second radio bearer following receipt of a latest sequential PDCP SDU associated with the respective first radio bearer or second radio bearer, the respective first radio bearer or second radio bearer having an associated reordering window;
discard a received PDCP SDU that is received outside of the associated reordering window if the empty buffer timer has not expired; and
shift the associated reordering window if the received PDCP SDU is received outside of the associated reordering window and the empty buffer timer has expired.

* * * * *